(12) United States Patent
Yan et al.

(10) Patent No.: US 10,863,487 B2
(45) Date of Patent: Dec. 8, 2020

(54) UPLINK CONTROL CHANNEL SENDING METHOD, UPLINK CONTROL CHANNEL RECEIVING METHOD, AND APPARATUS

(71) Applicant: Huawei Technologies Co., Ltd., Shenzhen (CN)

(72) Inventors: Zhiyu Yan, Shenzhen (CN); Lei Guan, Beijing (CN); Juan Zheng, Beijing (CN); Yuan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/231,558

(22) Filed: Dec. 23, 2018

(65) Prior Publication Data
US 2019/0132834 A1 May 2, 2019

Related U.S. Application Data

(63) Continuation of application No. PCT/CN2016/088041, filed on Jun. 30, 2016.

(51) Int. Cl.
*H04B 7/00* (2006.01)
*H04W 72/04* (2009.01)
(Continued)

(52) U.S. Cl.
CPC ....... *H04W 72/0413* (2013.01); *H04L 1/1812* (2013.01); *H04L 1/1854* (2013.01); *H04L 5/0007* (2013.01); *H04L 5/0032* (2013.01); *H04L 5/0055* (2013.01); *H04W 52/146* (2013.01); *H04W 52/325* (2013.01);
(Continued)

(58) Field of Classification Search
USPC .................................. 370/310, 328, 329, 437
See application file for complete search history.

(56) References Cited

U.S. PATENT DOCUMENTS 9,014,063 B2 *  4/2015  Lee ........................ H04L 1/1861
                                                    370/280
9,408,158 B2 *  8/2016  Yin ........................ H04W 52/22
(Continued)

FOREIGN PATENT DOCUMENTS

CN     102870363 A     1/2013
CN     104272635 A     1/2015
(Continued)

OTHER PUBLICATIONS

Qualcomm Incorporated, "UL Power Control for Multicarrier Operation," 3GPP TSG RAN WG1 #59bis, R1-100677, Valencia, Spain, Jan. 18-22, 2010, 5 pages.
(Continued)

*Primary Examiner* — Dmitry Levitan
(74) *Attorney, Agent, or Firm* — Slater Matsil, LLP

(57) ABSTRACT

Embodiments of the present invention provide an uplink control channel sending method, an uplink control channel receiving method, and an apparatus. The sending method includes: receiving, by terminal device, downlink data from a network device in each subframe in a first subframe set; obtaining, by the terminal device, first downlink control information from the network device; and sending, by the terminal device, a target physical uplink control channel in a first uplink subframe according to an indication of the first downlink control information.

20 Claims, 5 Drawing Sheets

(51) Int. Cl.
   *H04W 52/32*   (2009.01)
   *H04L 1/18*    (2006.01)
   *H04L 5/00*    (2006.01)
   *H04W 52/36*   (2009.01)
   *H04W 52/14*   (2009.01)
   *H04W 72/12*   (2009.01)

(52) U.S. Cl.
   CPC ........... *H04W 52/36* (2013.01); *H04W 72/04* (2013.01); *H04W 72/042* (2013.01); *H04W 72/0446* (2013.01); *H04W 72/1284* (2013.01)

(56) References Cited

U.S. PATENT DOCUMENTS

| | | | |
|---|---|---|---|
| 9,674,790 B2* | 6/2017 | Lee | H04W 52/16 |
| 9,955,461 B2* | 4/2018 | Song | H04W 72/0413 |
| 9,980,255 B2* | 5/2018 | Cheng | H04W 72/0413 |
| 10,034,281 B2* | 7/2018 | Lee | H04L 1/1861 |
| 10,098,143 B2* | 10/2018 | Kusashima | H04W 28/06 |
| 10,117,228 B2* | 10/2018 | Papasakellariou | H04W 72/0406 |
| 10,194,423 B2* | 1/2019 | Hwang | H04B 7/02 |
| 10,492,216 B2* | 11/2019 | Qiang | H04L 1/1861 |
| 2013/0039307 A1 | 2/2013 | Han et al. | |
| 2013/0230030 A1 | 9/2013 | Papasakellariou et al. | |
| 2014/0119249 A1 | 5/2014 | Park | |
| 2014/0177555 A1* | 6/2014 | Ng | H04L 5/0053 370/329 |
| 2015/0092702 A1 | 4/2015 | Chen et al. | |
| 2015/0181588 A1 | 6/2015 | Song et al. | |
| 2015/0264678 A1 | 9/2015 | Yin et al. | |
| 2016/0029365 A1 | 1/2016 | Papasakellariou et al. | |
| 2017/0230990 A1 | 8/2017 | Zhang | |
| 2018/0019842 A1* | 1/2018 | Fu | H04L 1/1864 |
| 2018/0352464 A1 | 12/2018 | Zhou | |
| 2020/0155337 A1 | 5/2020 | Choi et al. | |

FOREIGN PATENT DOCUMENTS

| | | |
|---|---|---|
| CN | 104798429 A | 7/2015 |
| CN | 105337710 A | 2/2016 |
| CN | 105594286 A | 5/2016 |
| CN | 105722234 A | 6/2016 |
| JP | 2013529016 A | 7/2013 |
| JP | 2014503140 A | 2/2014 |
| JP | 2015513863 A | 5/2015 |
| WO | 2013048114 A2 | 4/2013 |
| WO | 2015018084 A1 | 2/2015 |

OTHER PUBLICATIONS

3GPP TS 36.211 V13.1.0; 3rd Generation Partnership Project; Technical Specification Group Radio Access Network; Evolved Universal Terrestrial Radio Access (E-UTRA); Physical channels and modulation (Release 13), Mar. 2016, 155 pages.

3GPP TS 36.213 V13.1.1; 3rd Generation Partnership Project; Technical Specification Group Radio Access Network; Evolved Universal Terrestrial Radio Access (E-UTRA); Physical layer procedures (Release 13); Mar. 2016, 361 pages.

3GPP TS 36.331 V13.1.0 ; 3rd Generation Partnership Project; Technical Specification Group Radio Access Network; Evolved Universal Terrestrial Radio Access (E-UTRA); Radio Resource Control (RRC); Protocol specification (Release 13); Mar. 2016, 551 pages.

* cited by examiner

UPLINK CONTROL CHANNEL SENDING METHOD, UPLINK CONTROL CHANNEL RECEIVING METHOD, AND APPARATUS

CROSS-REFERENCE TO RELATED APPLICATIONS

This application is a continuation of International Application No. PCT/CN2016/088041, filed on Jun. 30, 2016, the disclosure of which is hereby incorporated by reference in its entirety.

TECHNICAL FIELD

The present invention relates to the field of communications technologies, and in particular, to an uplink control channel sending method, an uplink control channel receiving method, and an apparatus.

BACKGROUND

In a Long Term Evolution (LTE) system, a time-frequency resource is divided into a time-domain symbol in time domain and a subcarrier in frequency domain, and a minimum resource granularity is referred to as a resource element (RE), namely, a time-frequency grid including a time-domain symbol in time domain and a subcarrier in frequency domain. Service transmission in the LTE system is based on scheduling by a base station. A basic time unit of scheduling by the base station is a subframe, and one subframe includes a plurality of time-domain symbols. A specific scheduling procedure is as follows: The base station sends a control channel such as a physical downlink control channel (PDCCH) or an enhanced PDCCH (EPDCCH). The control channel may carry scheduling information of a data channel such as a physical downlink shared channel (PDSCH) or a physical uplink shared channel (PUSCH), and the scheduling information includes control information such as resource allocation information and a modulation and coding scheme. User equipment (UE) detects the control channel in a subframe, and receives a downlink data channel or sends an uplink data channel based on the scheduling information carried on the detected control channel. LTE supports frequency division duplex (FDD) and time division duplex (TDD). In an FDD system, downlink transmission and uplink transmission are performed on different carriers. In a TDD system, downlink transmission and uplink transmission are performed on a same carrier at different time. LTE currently supports seven different fixed TDD uplink-downlink subframe configurations, and a hybrid automatic repeat request (HARQ) mechanism is used in LTE. Downlink transmission is used as an example. After receiving a PDSCH, the UE feeds back an acknowledgement (ACK) or a negative acknowledgement (NACK) on a physical uplink control channel (PUCCH) to indicate whether the PDSCH is correctly received. In FDD, the UE determines, based on a time of receiving the PDSCH and a preset timing relationship between the PDSCH and a HARQ-ACK, to send the PUCCH. For example, after receiving the PDSCH in a subframe n−4, the UE feeds back an ACK/NACK in a subframe n, and this is similar in TDD. LTE further supports a carrier aggregation (CA) technology, that is, the base station configures a plurality of carriers for UE to improve a data rate of the UE. The plurality of carriers are synchronously sent in time domain, and the UE may separately detect a PDCCH and a PDSCH corresponding to the PDCCH for scheduling each carrier. A specific detection process of each carrier is similar to the foregoing single carrier case.

LTE supports two frame structures: Type1 and Type2 on an air interface. Type1 is used for FDD. Type2 is used for TDD, and a length of a radio frame is 10 ms. The 10 ms radio frame in TDD includes 10 subframes. That each of the 10 subframes is configured as a downlink subframe or an uplink subframe or a special subframe is preconfigured for the UE by using configuration information. On an unlicensed spectrum resource, to implement a coexistence characteristic that a plurality of communications systems occupy the unlicensed spectrum resource without affecting each other, a listen before talk (LBT) channel access mechanism may be used. That is, before the UE sends data on the unlicensed spectrum resource, the UE first detects, through listening, whether a channel is idle, and if the channel is idle, the UE may use the channel on the unlicensed spectrum resource. In an existing LTE system, downlink control information for scheduling downlink data by the base station for the UE includes two pieces of control information. A first piece of control information is a downlink assignment index (DAI), and a second piece of control information is a power control index of a physical uplink control channel. The UE determines a power adjustment value of the physical uplink control channel and a resource of the physical uplink control channel based on the two pieces of control information in the downlink control information corresponding to the received downlink data. Second piece of control information in downlink control information of DAI=1 on an anchor carrier is used to determine the power adjustment value for sending the physical uplink control channel by the UE, and second piece of control information in other downlink control information is used to determine which one of a plurality of preconfigured resources is the resource for sending the PUCCH by the UE.

Due to the LBT mechanism, that any subframe is a downlink subframe or an uplink subframe cannot be preconfigured. Considering that both the base station and the UE have an opportunistic characteristic of occupying an unlicensed spectrum, communication cannot be performed on a carrier on the unlicensed spectrum based on a fixed subframe ratio in the LTE system. It is also difficult for the UE to determine, based on the timing relationship between receiving a PDSCH and sending a HARQ-ACK corresponding to the PDSCH in the existing LTE system, to send the PUCCH. In addition, because the communication cannot be performed on the unlicensed carrier based on a correspondence between downlink data in a downlink subframe set and an uplink subframe of a fixed timing relationship in the LTE system, the UE cannot use the two pieces of control information in the downlink control information in the fixed downlink subframe set corresponding to the uplink subframe to determine the resource for sending the PUCCH and the power adjustment value for sending the PUCCH.

Therefore, how the UE sends the PUCCH on the unlicensed spectrum resource and how the UE determines, when sending the PUCCH, the resource for sending the PUCCH and the power adjustment value for sending the PUCCH are problems that need to be resolved.

SUMMARY

Embodiments of the present invention provide an uplink control channel sending method, an uplink control channel receiving method, and an apparatus, to resolve a problem of how UE sends a physical uplink control channel on a unlicensed spectrum resource.

According to a first aspect, an embodiment of the present invention provides an uplink control channel sending method, including: receiving, by UE, downlink data sent by a network device in each subframe in a first subframe set, where the first subframe set includes N subframes, and each of the N subframes is a downlink full subframe, or M of the N subframes are downlink partial subframes, and N-M of the N subframes are downlink full subframes, where M is less than or equal to N, and both M and N are integers; obtaining, by the UE, first downlink control information sent by the network device; and sending, by the UE, a target physical uplink control channel in a first uplink subframe according to an indication of the first downlink control information, where the target physical uplink control channel includes first uplink control information, and the first uplink control information includes hybrid automatic repeat request acknowledgement information corresponding to the downlink data that is in each subframe in the first subframe set and that is received by the UE. In the uplink control channel sending method provided in this embodiment of the present invention, after sending the downlink data to the UE in each subframe in the first subframe set, the network device sends trigger information (that is, the first downlink control information) to the UE to trigger the UE to send the target physical uplink control channel in the first uplink subframe. The target physical uplink control channel carries the first uplink control information including the hybrid automatic repeat request acknowledgement information corresponding to the downlink data that is in each subframe in the first subframe set and that is received by the UE. In this way, a problem of how the UE sends a physical uplink control channel on a unlicensed spectrum resource is resolved.

In a possible design, the first downlink control information is first-type downlink control information, and a resource of the target physical uplink control channel is a physical uplink control channel resource in a first physical uplink control channel resource set; or the first downlink control information is second-type downlink control information, and a resource of the target physical uplink control channel is a physical uplink control channel resource in a second physical uplink control channel resource set. The first-type downlink control information is UE-specific physical downlink control information, the second-type downlink control information is UE-group-specific physical downlink control information or common physical downlink control information, and each of the first physical uplink control channel resource set and the second physical uplink control channel resource set is a set of physical uplink control channel resources configured by the network device for the UE. In this possible design, a resource for sending a physical uplink control channel by the UE is the first uplink subframe in time domain, and may be a physical uplink control channel resource in a physical uplink control channel resource set preconfigured by the network device in frequency domain and/or orthogonal code resource domain. For a type (unicast and broadcast) of the first downlink control information, physical uplink control channel resource sets preconfigured by the network device are mutually independent, and the UE may select a physical uplink control channel resource from the preconfigured physical uplink control channel resource set based on the type of the first downlink control information. In this way, a problem of how the UE determines a resource for sending a physical uplink control channel is resolved.

In a possible design, the first physical uplink control channel resource set and the second physical uplink control channel resource set are sets separately configured by the network device for the UE; or the first physical uplink control channel resource set is a set configured by the network device for the UE, and the second physical uplink control channel resource set is a subset of the first physical uplink control channel resource set.

In a possible design, the first physical uplink control channel resource set includes at least two physical uplink control channel resources, and the second physical uplink control channel resource set includes one physical uplink control channel resource.

In a possible design, the first downlink control information is the second-type downlink control information, the second physical uplink control channel resource set is an empty set, and the method further includes: skipping, by the UE, sending the first uplink control information in the first uplink subframe.

In a possible design, the first uplink subframe is a first-type uplink subframe, and a resource of the target physical uplink control channel is a physical uplink control channel resource in a third physical uplink control channel resource set; or the first uplink subframe is a second-type uplink subframe, and a resource of the target physical uplink control channel is a physical uplink control channel resource in a fourth physical uplink control channel resource set; and the first-type uplink subframe is an uplink subframe in which a physical uplink control channel sent by the UE occupies R symbols, the second-type uplink subframe is an uplink subframe in which a physical uplink control channel sent by the UE occupies fewer than R symbols, and each of the third physical uplink control channel resource set and the fourth physical uplink control channel resource set is a set of physical uplink control channel resources configured by the network device for the UE, where R is an integer.

In a possible design, the third physical uplink control channel resource set and the fourth physical uplink control channel resource set are sets separately configured by the network device for the UE; or the third physical uplink control channel resource set is a set configured by the network device for the UE, and the fourth physical uplink control channel resource set is a subset of the third physical uplink control channel resource set.

In a possible design, the first uplink subframe is the second-type uplink subframe, the fourth physical uplink control channel resource set is an empty set, and the method further includes: skipping, by the UE, sending the first uplink control information in the first uplink subframe.

In a possible design, the first downlink control information includes first indication information; when the first indication information is first information, the first downlink control information is used to instruct the UE to send the target physical uplink control channel; and when the first indication information is second information, the first downlink control information is used to instruct the UE to send a target physical uplink shared channel, and the target physical uplink shared channel carries uplink data or carries uplink data and hybrid automatic repeat request acknowledgement information. In this possible design, the first downlink control information sent by the network device to the UE may be in a same format as control information that is sent by the network device to the UE and that is used to schedule the UE to send an uplink shared channel, so that complexity of blind detection by the UE can be reduced.

In a possible design, the first downlink control information includes second indication information, the second indication information is used to indicate a first power adjustment value for sending the target physical uplink control channel by the UE, and transmit power for sending the target physical uplink control channel by the UE includes a power adjustment amount indicated by the first power adjustment value.

In a possible design, the transmit power of the target physical uplink control channel includes a power adjustment amount indicated by a second power adjustment value, the second power adjustment value is a power adjustment value determined by the UE according to an indication value of a power adjustment field in downlink control information included in a first control information group, and the first control information group includes downlink control information corresponding to downlink data in each subframe in a second subframe set; the second subframe set is equivalent to the first subframe set, or the second subframe set is a set of subframes in the first subframe set that are located on a first carrier, or the second subframe set is a set of subframes that are in the first subframe set and in which downlink data corresponds to downlink control information that is located on the first carrier; and the first carrier is a carrier on which the target physical uplink control channel is located, or the first carrier is a carrier on which the first downlink control information is located.

In the foregoing two possible designs, a power adjustment value for sending a physical uplink control channel may be sent to the UE by adding the power adjustment value to the first downlink control information, and/or a power adjustment value for sending a physical uplink control channel is implemented by the network device by using the downlink control information corresponding to the downlink data in the first subframe set to indicate a power adjustment amount for sending a target physical uplink control channel on each carrier. In this way, a problem of how to determine, when the carrier on which the target physical uplink control channel sent by the UE is located can dynamically vary in a carrier configuration set, a power adjustment value for sending a physical uplink control channel is resolved.

In a possible design, the first carrier is a carrier in a carrier configuration set, the carrier configuration set is a set of carriers configured for the UE to communicate with the network device, the carrier configuration set includes H carriers, and the first carrier is a $G^{th}$ carrier in the carrier configuration set, where both G and H are positive integers, $H \geq 2$, $1 \leq G \leq H$, and a value of G can vary in all subframes.

In a possible design, the second subframe set is a set of all subframes in the first subframe set that are located on the first carrier; or the second subframe set is a set of all subframes that are in the first subframe set and in which downlink data corresponds to downlink control information that is located on the first carrier; or the second subframe set is a set of all subframes in the first subframe set that are located on the first carrier and in which corresponding downlink control information is located on the first carrier.

In a possible design, indication values of power adjustment fields in downlink control information in subframes indicating same time in the first control information group are the same.

According to a second aspect, an embodiment of the present invention provides an uplink control channel receiving method, including: sending, by a network device, downlink data to a terminal device UE in each subframe in a first subframe set, where the first subframe set includes N subframes, and each of the N subframes is a downlink full subframe, or M of the N subframes are downlink partial subframes, and N-M of the N subframes are downlink full subframes, where M is less than or equal to N, and both M and N are integers; sending, by the network device, first downlink control information to the UE; and receiving, by the network device, a target physical uplink control channel sent by the UE in a first uplink subframe according to an indication of the first downlink control information, where the target physical uplink control channel includes first uplink control information, and the first uplink control information includes hybrid automatic repeat request acknowledgement information corresponding to the downlink data that is in each subframe in the first subframe set and that is received by the UE. In the uplink control channel receiving method provided in this embodiment of the present invention, after sending the downlink data to the UE in each subframe in the first subframe set, the network device sends trigger information (that is, the first downlink control information) to the UE to trigger the UE to send the target physical uplink control channel in the first uplink subframe. The target physical uplink control channel carries the first uplink control information including the hybrid automatic repeat request acknowledgement information corresponding to the downlink data that is in each subframe in the first subframe set and that is received by the UE. In this way, a problem of how the UE sends a physical uplink control channel on a unlicensed spectrum resource is resolved.

In a possible design, the first downlink control information is first-type downlink control information, and a resource of the target physical uplink control channel is a physical uplink control channel resource in a first physical uplink control channel resource set; or the first downlink control information is second-type downlink control information, and a resource of the target physical uplink control channel is a physical uplink control channel resource in a second physical uplink control channel resource set. The first-type downlink control information is UE-specific physical downlink control information, the second-type downlink control information is UE-group-specific physical downlink control information or common physical downlink control information, and each of the first physical uplink control channel resource set and the second physical uplink control channel resource set is a set of physical uplink control channel resources configured by the network device for the UE. In this possible design, a resource for sending a physical uplink control channel by the UE is the first uplink subframe in time domain, and may be a physical uplink control channel resource in a physical uplink control channel resource set preconfigured by the network device in frequency domain and/or orthogonal code resource domain. For a type (unicast and broadcast) of the first downlink control information, physical uplink control channel resource sets preconfigured by the network device are mutually independent, and the UE may select a physical uplink control channel resource from the preconfigured physical uplink control channel resource set based on the type of the first downlink control information. In this way, a problem of how the UE determines a resource for sending a physical uplink control channel is resolved.

In a possible design, the method further includes: separately configuring, by the network device, the first physical uplink control channel resource set and the second physical uplink control channel resource set for the UE; or configuring, by the network device, the first physical uplink control channel resource set for the UE, where the second physical uplink control channel resource set is a subset of the first physical uplink control channel resource set.

In a possible design, the first physical uplink control channel resource set includes at least two physical uplink control channel resources, and the second physical uplink control channel resource set includes one physical uplink control channel resource.

In a possible design, the first downlink control information is the second-type downlink control information, the second physical uplink control channel resource set is an empty set, and the method further includes: skipping, by the network device, receiving the first uplink control information in the first uplink subframe.

In a possible design, the first uplink subframe is a first-type uplink subframe, and a resource of the target physical uplink control channel is a physical uplink control channel resource in a third physical uplink control channel resource set; or the first uplink subframe is a second-type uplink subframe, and a resource of the target physical uplink control channel is a physical uplink control channel resource in a fourth physical uplink control channel resource set; and the first-type uplink subframe is an uplink subframe in which a physical uplink control channel sent by the UE occupies R symbols, the second-type uplink subframe is an uplink subframe in which a physical uplink control channel sent by the UE occupies fewer than R symbols, and each of the third physical uplink control channel resource set and the fourth physical uplink control channel resource set is a set of physical uplink control channel resources configured by the network device for the UE, where R is an integer.

In a possible design, the method further includes: separately configuring, by the network device, the third physical uplink control channel resource set and the fourth physical uplink control channel resource set for the UE; or configuring, by the network device, the third physical uplink control channel resource set for the UE, where the fourth physical uplink control channel resource set is a subset of the third physical uplink control channel resource set.

In a possible design, the first uplink subframe is the second-type uplink subframe, the fourth physical uplink control channel resource set is an empty set, and the method further includes: skipping, by the network device, receiving the first uplink control information in the first uplink subframe.

In a possible design, the first downlink control information includes first indication information; when the first indication information is first information, the first downlink control information is used to instruct the UE to send the target physical uplink control channel; and when the first indication information is second information, the first downlink control information is used to instruct the UE to send a target physical uplink shared channel, and the target physical uplink shared channel carries uplink data or carries uplink data and hybrid automatic repeat request acknowledgement information. In this possible design, the first downlink control information sent by the network device to the UE may be in a same format as control information that is sent by the network device to the UE and that is used to schedule the UE to send an uplink shared channel, so that complexity of blind detection by the UE can be reduced.

In a possible design, the first downlink control information includes second indication information, the second indication information is used to indicate a first power adjustment value for sending the target physical uplink control channel by the UE, and transmit power for sending the target physical uplink control channel by the UE includes a power adjustment amount indicated by the first power adjustment value.

In a possible design, the transmit power of the target physical uplink control channel includes a power adjustment amount indicated by a second power adjustment value, the second power adjustment value is a power adjustment value determined by the UE according to an indication value of a power adjustment field in downlink control information included in a first control information group, and the first control information group includes downlink control information corresponding to downlink data in each subframe in a second subframe set; the second subframe set is equivalent to the first subframe set, or the second subframe set is a set of subframes in the first subframe set that are located on a first carrier, or the second subframe set is a set of subframes that are in the first subframe set and in which downlink data corresponds to downlink control information that is located on the first carrier; and the first carrier is a carrier on which the target physical uplink control channel is located, or the first carrier is a carrier on which the first downlink control information is located.

In the foregoing two possible designs, a power adjustment value for sending a physical uplink control channel may be sent to the UE by adding the power adjustment value to the first downlink control information, and/or a power adjustment value for sending a physical uplink control channel is implemented by the network device by using the downlink control information corresponding to the downlink data in the first subframe set to indicate a power adjustment amount for sending a target physical uplink control channel on each carrier. In this way, a problem of how to determine, when the carrier on which the target physical uplink control channel sent by the UE is located can dynamically vary in a carrier configuration set, a power adjustment value for sending a physical uplink control channel is resolved.

In a possible design, the first carrier is a carrier in a carrier configuration set, the carrier configuration set is a set of carriers configured for the UE to communicate with the network device, the carrier configuration set includes H carriers, and the first carrier is a $G^{th}$ carrier in the carrier configuration set, where both G and H are positive integers, $H \geq 2$, $1 \leq G \leq H$, and a value of G can vary in all subframes.

In a possible design, the second subframe set is a set of all subframes in the first subframe set that are located on the first carrier; or the second subframe set is a set of all subframes that are in the first subframe set and in which downlink data corresponds to downlink control information that is located on the first carrier; or the second subframe set is a set of all subframes in the first subframe set that are located on the first carrier and in which corresponding downlink control information is located on the first carrier.

In a possible design, indication values of power adjustment fields in downlink control information in subframes indicating same time in the first control information group are the same.

According to a third aspect, an embodiment of the present invention provides a terminal device, including: a receiving module, configured to receive downlink data sent by a network device in each subframe in a first subframe set, where the first subframe set includes N subframes, and each of the N subframes is a downlink full subframe, or M of the N subframes are downlink partial subframes, and N-M of the N subframes are downlink full subframes, where M is less than or equal to N, and both M and N are integers; where the receiving module is further configured to obtain first downlink control information sent by the network device; and a sending module, configured to send a target physical uplink control channel in a first uplink subframe according to an indication of the first downlink control information, where the target physical uplink control channel includes first uplink control information, and the first uplink control information includes hybrid automatic repeat request acknowledgement information corresponding to the downlink data that is in each subframe in the first subframe set and that is received by the receiving module.

In a possible design, the first downlink control information is first-type downlink control information, and a resource of the target physical uplink control channel is a physical uplink control channel resource in a first physical uplink control channel resource set; or the first downlink control information is second-type downlink control information, and a resource of the target physical uplink control channel is a physical uplink control channel resource in a second physical uplink control channel resource set. The first-type downlink control information is terminal-device-specific physical downlink control information, the second-type downlink control information is terminal-device-group-specific physical downlink control information or common physical downlink control information, and each of the first physical uplink control channel resource set and the second physical uplink control channel resource set is a set of physical uplink control channel resources configured by the network device for the terminal device.

In a possible design, the first physical uplink control channel resource set and the second physical uplink control channel resource set are sets separately configured by the network device for the terminal device; or the first physical uplink control channel resource set is a set configured by the network device for the terminal device, and the second physical uplink control channel resource set is a subset of the first physical uplink control channel resource set.

In a possible design, the first physical uplink control channel resource set includes at least two physical uplink control channel resources, and the second physical uplink control channel resource set includes one physical uplink control channel resource.

In a possible design, the first downlink control information is the second-type downlink control information, the second physical uplink control channel resource set is an empty set, and the sending module does not send the first uplink control information in the first uplink subframe.

In a possible design, the first uplink subframe is a first-type uplink subframe, and a resource of the target physical uplink control channel is a physical uplink control channel resource in a third physical uplink control channel resource set; or the first uplink subframe is a second-type uplink subframe, and a resource of the target physical uplink control channel is a physical uplink control channel resource in a fourth physical uplink control channel resource set. The first-type uplink subframe is an uplink subframe in which a physical uplink control channel sent by the sending module occupies R symbols, the second-type uplink subframe is an uplink subframe in which a physical uplink control channel sent by the sending module occupies fewer than R symbols, and each of the third physical uplink control channel resource set and the fourth physical uplink control channel resource set is a set of physical uplink control channel resources configured by the network device for the terminal device, where R is an integer.

In a possible design, the third physical uplink control channel resource set and the fourth physical uplink control channel resource set are sets separately configured by the network device for the terminal device; or the third physical uplink control channel resource set is a set configured by the network device for the terminal device, and the fourth physical uplink control channel resource set is a subset of the third physical uplink control channel resource set.

In a possible design, the first uplink subframe is the second-type uplink subframe, the fourth physical uplink control channel resource set is an empty set, and the sending module does not send the first uplink control information in the first uplink subframe.

In a possible design, the first downlink control information includes first indication information; when the first indication information is first information, the first downlink control information is used to instruct the sending module to send the target physical uplink control channel; and when the first indication information is second information, the first downlink control information is used to instruct the sending module to send a target physical uplink shared channel, and the target physical uplink shared channel carries uplink data or carries uplink data and hybrid automatic repeat request acknowledgement information.

In a possible design, the first downlink control information includes second indication information, the second indication information is used to indicate a first power adjustment value for sending the target physical uplink control channel by the sending module, and transmit power for sending the target physical uplink control channel by the sending module includes a power adjustment amount indicated by the first power adjustment value.

In a possible design, the transmit power of the target physical uplink control channel includes a power adjustment amount indicated by a second power adjustment value, the second power adjustment value is a power adjustment value determined by the terminal device according to an indication value of a power adjustment field in downlink control information included in a first control information group, and the first control information group includes downlink control information corresponding to downlink data in each subframe in a second subframe set; the second subframe set is equivalent to the first subframe set, or the second subframe set is a set of subframes in the first subframe set that are located on a first carrier, or the second subframe set is a set of subframes that are in the first subframe set and in which downlink data corresponds to downlink control information that is located on the first carrier; and the first carrier is a carrier on which the target physical uplink control channel is located, or the first carrier is a carrier on which the first downlink control information is located.

In a possible design, the first carrier is a carrier in a carrier configuration set, the carrier configuration set is a set of carriers configured for the terminal device to communicate with the network device, the carrier configuration set includes H carriers, and the first carrier is a $G^{th}$ carrier in the carrier configuration set, where both G and H are positive integers, H≥2, 1≤G≤H, and a value of G can vary in all subframes.

In a possible design, the second subframe set is a set of all subframes in the first subframe set that are located on the first carrier; or the second subframe set is a set of all subframes that are in the first subframe set and in which downlink data corresponds to downlink control information that is located on the first carrier; or the second subframe set is a set of all subframes in the first subframe set that are located on the first carrier and in which corresponding downlink control information is located on the first carrier.

In a possible design, indication values of power adjustment fields in downlink control information in subframes indicating same time in the first control information group are the same.

For beneficial effects of the terminal device provided in the third aspect and the possible designs of the third aspect, refer to the beneficial effects brought by the first aspect and the possible designs of the first aspect. Details are not described herein again.

According to a fourth aspect, an embodiment of the present invention provides a network device, including: a sending module, configured to send downlink data to a terminal device UE in each subframe in a first subframe set, where the first subframe set includes N subframes, and each of the N subframes is a downlink full subframe, or M of the N subframes are downlink partial subframes, and N-M of the N subframes are downlink full subframes, where M is less than or equal to N, and both M and N are integers; where the sending module is further configured to send first downlink control information to the UE; and a receiving module, configured to receive a target physical uplink control channel sent by the UE in a first uplink subframe according to an indication of the first downlink control information, where the target physical uplink control channel includes first uplink control information, and the first uplink control information includes hybrid automatic repeat request acknowledgement information corresponding to the downlink data that is in each subframe in the first subframe set and that is received by the UE.

In a possible design, the first downlink control information is first-type downlink control information, and a resource of the target physical uplink control channel is a physical uplink control channel resource in a first physical uplink control channel resource set; or the first downlink control information is second-type downlink control information, and a resource of the target physical uplink control channel is a physical uplink control channel resource in a second physical uplink control channel resource set. The first-type downlink control information is UE-specific physical downlink control information, the second-type downlink control information is UE-group-specific physical downlink control information or common physical downlink control information, and each of the first physical uplink control channel resource set and the second physical uplink control channel resource set is a set of physical uplink control channel resources configured by the network device for the UE.

In a possible design, the network device further includes: a first configuration module, configured to: separately configure the first physical uplink control channel resource set and the second physical uplink control channel resource set for the UE; or configure the first physical uplink control channel resource set for the UE, where the second physical uplink control channel resource set is a subset of the first physical uplink control channel resource set.

In a possible design, the first physical uplink control channel resource set includes at least two physical uplink control channel resources, and the second physical uplink control channel resource set includes one physical uplink control channel resource.

In a possible design, the first downlink control information is the second-type downlink control information, the second physical uplink control channel resource set is an empty set, and the receiving module does not receive the first uplink control information in the first uplink subframe.

In a possible design, the first uplink subframe is a first-type uplink subframe, and a resource of the target physical uplink control channel is a physical uplink control channel resource in a third physical uplink control channel resource set; or the first uplink subframe is a second-type uplink subframe, and a resource of the target physical uplink control channel is a physical uplink control channel resource in a fourth physical uplink control channel resource set. The first-type uplink subframe is an uplink subframe in which a physical uplink control channel sent by the UE occupies R symbols, the second-type uplink subframe is an uplink subframe in which a physical uplink control channel sent by the UE occupies fewer than R symbols, and each of the third physical uplink control channel resource set and the fourth physical uplink control channel resource set is a set of physical uplink control channel resources configured by the network device for the UE, where R is an integer.

In a possible design, the network device further includes: a second configuration module, configured to: separately configure the third physical uplink control channel resource set and the fourth physical uplink control channel resource set for the UE; or configure the third physical uplink control channel resource set for the UE, where the fourth physical uplink control channel resource set is a subset of the third physical uplink control channel resource set.

In a possible design, the first uplink subframe is the second-type uplink subframe, the fourth physical uplink control channel resource set is an empty set, and the receiving module does not receive the first uplink control information in the first uplink subframe.

In a possible design, the first downlink control information includes first indication information; when the first indication information is first information, the first downlink control information is used to instruct the UE to send the target physical uplink control channel; and when the first indication information is second information, the first downlink control information is used to instruct the UE to send a target physical uplink shared channel, and the target physical uplink shared channel carries uplink data or carries uplink data and hybrid automatic repeat request acknowledgement information.

In a possible design, the first downlink control information includes second indication information, the second indication information is used to indicate a first power adjustment value for sending the target physical uplink control channel by the UE, and transmit power for sending the target physical uplink control channel by the UE includes a power adjustment amount indicated by the first power adjustment value.

In a possible design, the transmit power of the target physical uplink control channel includes a power adjustment amount indicated by a second power adjustment value, the second power adjustment value is a power adjustment value determined by the UE according to an indication value of a power adjustment field in downlink control information included in a first control information group, and the first control information group includes downlink control information corresponding to downlink data in each subframe in a second subframe set; the second subframe set is equivalent to the first subframe set, or the second subframe set is a set of subframes in the first subframe set that are located on a first carrier, or the second subframe set is a set of subframes that are in the first subframe set and in which downlink data corresponds to downlink control information that is located on the first carrier; and the first carrier is a carrier on which the target physical uplink control channel is located, or the first carrier is a carrier on which the first downlink control information is located.

In a possible design, the first carrier is a carrier in a carrier configuration set, the carrier configuration set is a set of carriers configured for the UE to communicate with the network device, the carrier configuration set includes H carriers, and the first carrier is a $G^{th}$ carrier in the carrier configuration set, where both G and H are positive integers, $H \geq 2$, $1 \leq G \leq H$, and a value of G can vary in all subframes.

In a possible design, the second subframe set is a set of all subframes in the first subframe set that are located on the first carrier; or the second subframe set is a set of all subframes that are in the first subframe set and in which downlink data corresponds to downlink control information that is located on the first carrier; or the second subframe set is a set of all subframes in the first subframe set that are located on the first carrier and in which corresponding downlink control information is located on the first carrier.

In a possible design, indication values of power adjustment fields in downlink control information in subframes indicating same time in the first control information group are the same.

For beneficial effects of the network device provided in the fourth aspect and the possible designs of the fourth aspect, refer to the beneficial effects brought by the first aspect and the possible designs of the first aspect. Details are not described herein again.

According to a fifth aspect, an embodiment of the present invention provides a terminal device, including: a receiver, configured to receive downlink data sent by a network device in each subframe in a first subframe set, where the first subframe set includes N subframes, and each of the N subframes is a downlink full subframe, or M of the N subframes are downlink partial subframes, and N-M of the N subframes are downlink full subframes, where M is less than or equal to N, and both M and N are integers; where the receiver is further configured to obtain first downlink control information sent by the network device; and a transmitter, configured to send a target physical uplink control channel in a first uplink subframe according to an indication of the first downlink control information, where the target physical uplink control channel includes first uplink control information, and the first uplink control information includes hybrid automatic repeat request acknowledgement information corresponding to the downlink data that is in each subframe in the first subframe set and that is received by a receiver.

In a possible design, the first downlink control information is first-type downlink control information, and a resource of the target physical uplink control channel is a physical uplink control channel resource in a first physical uplink control channel resource set; or the first downlink control information is second-type downlink control information, and a resource of the target physical uplink control channel is a physical uplink control channel resource in a second physical uplink control channel resource set. The first-type downlink control information is terminal-device-specific physical downlink control information, the second-type downlink control information is terminal-device-group-specific physical downlink control information or common physical downlink control information, and each of the first physical uplink control channel resource set and the second physical uplink control channel resource set is a set of physical uplink control channel resources configured by the network device for the terminal device.

In a possible design, the first physical uplink control channel resource set and the second physical uplink control channel resource set are sets separately configured by the network device for the terminal device; or the first physical uplink control channel resource set is a set configured by the network device for the terminal device, and the second physical uplink control channel resource set is a subset of the first physical uplink control channel resource set.

In a possible design, the first physical uplink control channel resource set includes at least two physical uplink control channel resources, and the second physical uplink control channel resource set includes one physical uplink control channel resource.

In a possible design, the first downlink control information is the second-type downlink control information, the second physical uplink control channel resource set is an empty set, and the transmitter does not send the first uplink control information in the first uplink subframe.

In a possible design, the first uplink subframe is a first-type uplink subframe, and a resource of the target physical uplink control channel is a physical uplink control channel resource in a third physical uplink control channel resource set; or the first uplink subframe is a second-type uplink subframe, and a resource of the target physical uplink control channel is a physical uplink control channel resource in a fourth physical uplink control channel resource set. The first-type uplink subframe is an uplink subframe in which a physical uplink control channel sent by the transmitter occupies R symbols, the second-type uplink subframe is an uplink subframe in which a physical uplink control channel sent by the transmitter occupies fewer than R symbols, and each of the third physical uplink control channel resource set and the fourth physical uplink control channel resource set is a set of physical uplink control channel resources configured by the network device for the terminal device, where R is an integer.

In a possible design, the third physical uplink control channel resource set and the fourth physical uplink control channel resource set are sets separately configured by the network device for the terminal device; or the third physical uplink control channel resource set is a set configured by the network device for the terminal device, and the fourth physical uplink control channel resource set is a subset of the third physical uplink control channel resource set.

In a possible design, the first uplink subframe is the second-type uplink subframe, the fourth physical uplink control channel resource set is an empty set, and the transmitter does not send the first uplink control information in the first uplink subframe.

In a possible design, the first downlink control information includes first indication information; when the first indication information is first information, the first downlink control information is used to instruct the transmitter to send the target physical uplink control channel; and when the first indication information is second information, the first downlink control information is used to instruct the transmitter to send a target physical uplink shared channel, and the target physical uplink shared channel carries uplink data or carries uplink data and hybrid automatic repeat request acknowledgement information.

In a possible design, the first downlink control information includes second indication information, the second indication information is used to indicate a first power adjustment value for sending the target physical uplink control channel by the transmitter, and transmit power for sending the target physical uplink control channel by the transmitter includes a power adjustment amount indicated by the first power adjustment value.

In a possible design, the transmit power of the target physical uplink control channel includes a power adjustment amount indicated by a second power adjustment value, the second power adjustment value is a power adjustment value determined by the terminal device according to an indication value of a power adjustment field in downlink control information included in a first control information group, and the first control information group includes downlink control information corresponding to downlink data in each subframe in a second subframe set; the second subframe set is equivalent to the first subframe set, or the second subframe set is a set of subframes in the first subframe set that are located on a first carrier, or the second subframe set is a set of subframes that are in the first subframe set and in which downlink data corresponds to downlink control information that is located on the first carrier; and the first carrier is a carrier on which the target physical uplink control channel is located, or the first carrier is a carrier on which the first downlink control information is located.

In a possible design, the first carrier is a carrier in a carrier configuration set, the carrier configuration set is a set of carriers configured for the terminal device to communicate with the network device, the carrier configuration set includes H carriers, and the first carrier is a $G^{th}$ carrier in the carrier configuration set, where both G and H are positive integers, H≥2, 1≤G≤H, and a value of G can vary in all subframes.

In a possible design, the second subframe set is a set of all subframes in the first subframe set that are located on the first carrier; or the second subframe set is a set of all subframes that are in the first subframe set and in which downlink data corresponds to downlink control information that is located on the first carrier; or the second subframe set is a set of all subframes in the first subframe set that are located on the first carrier and in which corresponding downlink control information is located on the first carrier.

In a possible design, indication values of power adjustment fields in downlink control information in subframes indicating same time in the first control information group are the same.

For beneficial effects of the terminal device provided in the fifth aspect and the possible designs of the fifth aspect, refer to the beneficial effects brought by the first aspect and the possible designs of the first aspect. Details are not described herein again.

According to a sixth aspect, an embodiment of the present invention provides a network device, including: a transmitter, configured to send downlink data to a terminal device UE in each subframe in a first subframe set, where the first subframe set includes N subframes, and each of the N subframes is a downlink full subframe, or M of the N subframes are downlink partial subframes, and N-M of the N subframes are downlink full subframes, where M is less than or equal to N, and both M and N are integers; where the transmitter is further configured to send first downlink control information to the UE; and a receiver, configured to receive a target physical uplink control channel sent by the UE in a first uplink subframe according to an indication of the first downlink control information, where the target physical uplink control channel includes first uplink control information, and the first uplink control information includes hybrid automatic repeat request acknowledgement information corresponding to the downlink data that is in each subframe in the first subframe set and that is received by the UE.

In a possible design, the first downlink control information is first-type downlink control information, and a resource of the target physical uplink control channel is a physical uplink control channel resource in a first physical uplink control channel resource set; or the first downlink control information is second-type downlink control information, and a resource of the target physical uplink control channel is a physical uplink control channel resource in a second physical uplink control channel resource set. The first-type downlink control information is UE-specific physical downlink control information, the second-type downlink control information is UE-group-specific physical downlink control information or common physical downlink control information, and each of the first physical uplink control channel resource set and the second physical uplink control channel resource set is a set of physical uplink control channel resources configured by the network device for the UE.

In a possible design, the network device further includes: a first processor, configured to: separately configure the first physical uplink control channel resource set and the second physical uplink control channel resource set for the UE; or configure the first physical uplink control channel resource set for the UE, where the second physical uplink control channel resource set is a subset of the first physical uplink control channel resource set.

In a possible design, the first physical uplink control channel resource set includes at least two physical uplink control channel resources, and the second physical uplink control channel resource set includes one physical uplink control channel resource.

In a possible design, the first downlink control information is the second-type downlink control information, the second physical uplink control channel resource set is an empty set, and the receiver does not receive the first uplink control information in the first uplink subframe.

In a possible design, the first uplink subframe is a first-type uplink subframe, and a resource of the target physical uplink control channel is a physical uplink control channel resource in a third physical uplink control channel resource set; or the first uplink subframe is a second-type uplink subframe, and a resource of the target physical uplink control channel is a physical uplink control channel resource in a fourth physical uplink control channel resource set. The first-type uplink subframe is an uplink subframe in which a physical uplink control channel sent by the UE occupies R symbols, the second-type uplink subframe is an uplink subframe in which a physical uplink control channel sent by the UE occupies fewer than R symbols, and each of the third physical uplink control channel resource set and the fourth physical uplink control channel resource set is a set of physical uplink control channel resources configured by the network device for the UE, where R is an integer.

In a possible design, the network device further includes: a second processor, configured to: separately configure the third physical uplink control channel resource set and the fourth physical uplink control channel resource set for the UE; or configure the third physical uplink control channel resource set for the UE, where the fourth physical uplink control channel resource set is a subset of the third physical uplink control channel resource set.

In a possible design, the first uplink subframe is the second-type uplink subframe, the fourth physical uplink control channel resource set is an empty set, and the receiver does not receive the first uplink control information in the first uplink subframe.

In a possible design, the first downlink control information includes first indication information; when the first indication information is first information, the first downlink control information is used to instruct the UE to send the target physical uplink control channel; and when the first indication information is second information, the first downlink control information is used to instruct the UE to send a target physical uplink shared channel, and the target physical uplink shared channel carries uplink data or carries uplink data and hybrid automatic repeat request acknowledgement information.

In a possible design, the first downlink control information includes second indication information, the second indication information is used to indicate a first power adjustment value for sending the target physical uplink control channel by the UE, and transmit power for sending the target physical uplink control channel by the UE includes a power adjustment amount indicated by the first power adjustment value.

In a possible design, the transmit power of the target physical uplink control channel includes a power adjustment amount indicated by a second power adjustment value, the second power adjustment value is a power adjustment value determined by the UE according to an indication value of a power adjustment field in downlink control information included in a first control information group, and the first control information group includes downlink control information corresponding to downlink data in each subframe in a second subframe set; the second subframe set is equivalent to the first subframe set, or the second subframe set is a set of subframes in the first subframe set that are located on a first carrier, or the second subframe set is a set of subframes that are in the first subframe set and in which downlink data corresponds to downlink control information that is located on the first carrier; and the first carrier is a carrier on which the target physical uplink control channel is located, or the first carrier is a carrier on which the first downlink control information is located.

In a possible design, the first carrier is a carrier in a carrier configuration set, the carrier configuration set is a set of carriers configured for the UE to communicate with the network device, the carrier configuration set includes H carriers, and the first carrier is a $G^{th}$ carrier in the carrier configuration set, where both G and H are positive integers, $H \geq 2$, $1 \leq G \leq H$, and a value of G can vary in all subframes.

In a possible design, the second subframe set is a set of all subframes in the first subframe set that are located on the first carrier; or the second subframe set is a set of all subframes that are in the first subframe set and in which downlink data corresponds to downlink control information that is located on the first carrier; or the second subframe set is a set of all subframes in the first subframe set that are located on the first carrier and in which corresponding downlink control information is located on the first carrier.

In a possible design, indication values of power adjustment fields in downlink control information in subframes indicating same time in the first control information group are the same.

For beneficial effects of the network device provided in the sixth aspect and the possible designs of the sixth aspect, refer to the beneficial effects brought by the first aspect and the possible designs of the first aspect. Details are not described herein again.

According to a seventh aspect, an embodiment of the present invention provides an uplink control channel sending method, including: receiving, by a terminal device UE, downlink data sent by a network device in each subframe in a first subframe set, where the first subframe set includes N subframes, and each of the N subframes is a downlink full subframe, or M of the N subframes are downlink partial subframes, and N-M of the N subframes are downlink full subframes, where M is less than or equal to N, and both M and N are integers; obtaining, by the UE, first downlink control information sent by the network device; and determining, by the UE based on a resource allocation index value, whether to send first uplink control information on a target physical uplink control channel resource in a first uplink subframe according to an indication of the first downlink control information, where the resource allocation index value is used by the UE to determine the target physical uplink control channel resource, and the first uplink control information includes hybrid automatic repeat request acknowledgement information corresponding to the downlink data that is in each subframe in the first subframe set and that is received by the UE.

After sending the downlink data to the UE in each subframe in the first subframe set, the network device sends trigger information (that is, the first downlink control information) to the UE to trigger the UE to send the target physical uplink control channel in the first uplink subframe. The target physical uplink control channel carries the first uplink control information including the hybrid automatic repeat request acknowledgement information corresponding to the downlink data that is in each subframe in the first subframe set and that is received by the UE. In the method in this embodiment of the present invention, when the network device uses UE-group-specific downlink control information or common downlink control information to instruct a plurality of UEs to send target physical uplink control channels in a same uplink subframe, if a quantity of UEs sending target physical uplink control channels on a same time-frequency resource exceeds a quantity of supported UEs that can multiplex the time-frequency resource, the network device may set resource allocation index values of some UEs to a second index value indicating that there is no target physical uplink control channel. In this way, a problem of mutual interference caused by sending the target physical uplink control channels by the plurality of UEs is resolved.

In a possible design, the resource allocation index value is indication information in downlink control information corresponding to downlink data in some or all subframes in the first subframe set.

In a possible design, the resource allocation index value is a first-type index value or a second-type index value, the first-type index value is corresponding to an index value of the target physical uplink control channel resource in a reference physical uplink control channel resource set, the second-type index value indicates that there is no target physical uplink control channel resource, and the reference physical uplink control channel resource set is a set of physical uplink control channel resources configured by the network device for the UE.

The determining, by the UE based on a resource allocation index value, whether to send first uplink control information on a target physical uplink control channel resource in a first uplink subframe according to an indication of the first downlink control information includes: if the resource allocation index value is the first-type index value, sending, by the UE, the first uplink control information on the target physical uplink control channel resource that is in the first uplink subframe and that is corresponding to the resource allocation index value; or if the resource allocation index value is the second-type index value, skipping, by the UE, sending the first uplink control information in the first uplink subframe.

According to an eighth aspect, an embodiment of the present invention provides an uplink control channel receiving method, including: sending, by a network device, downlink data to a terminal device UE in each subframe in a first subframe set, where the first subframe set includes N subframes, and each of the N subframes is a downlink full subframe, or M of the N subframes are downlink partial subframes, and N-M of the N subframes are downlink full subframes, where M is less than or equal to N, and both M and N are integers; sending, by the network device, first downlink control information to the UE; and receiving, by the network device on a target physical uplink control channel resource in a first uplink subframe, first uplink control information sent by the UE, or skipping, by the network device, receiving the first uplink control information on the target physical uplink control channel resource in the first uplink subframe.

In a possible design, the resource allocation index value is indication information in downlink control information corresponding to downlink data in some or all subframes in the first subframe set.

In a possible design, the resource allocation index value is a first-type index value or a second-type index value, the first-type index value is corresponding to an index value of the target physical uplink control channel resource in a reference physical uplink control channel resource set, the second-type index value indicates that there is no target physical uplink control channel resource, and the reference physical uplink control channel resource set is a set of physical uplink control channel resources configured by the network device for the UE.

According to a ninth aspect, an embodiment of the present invention provides a terminal device, including: a receiving module, configured to receive downlink data sent by a network device in each subframe in a first subframe set, where the first subframe set includes N subframes, and each of the N subframes is a downlink full subframe, or M of the N subframes are downlink partial subframes, and N-M of the N subframes are downlink full subframes, where M is less than or equal to N, and both M and N are integers; where the receiving module is further configured to obtain first downlink control information sent by the network device; and a sending module, configured to determine, based on a resource allocation index value, whether to send first uplink control information on a target physical uplink control channel resource in a first uplink subframe according to an indication of the first downlink control information, where the resource allocation index value is used by the UE to determine the target physical uplink control channel resource, and the first uplink control information includes hybrid automatic repeat request acknowledgement information corresponding to the downlink data that is in each subframe in the first subframe set and that is received by the UE.

In a possible design, the resource allocation index value is indication information in downlink control information corresponding to downlink data in some or all subframes in the first subframe set.

In a possible design, the resource allocation index value is a first-type index value or a second-type index value, the first-type index value is corresponding to an index value of the target physical uplink control channel resource in a reference physical uplink control channel resource set, the second-type index value indicates that there is no target physical uplink control channel resource, and the reference physical uplink control channel resource set is a set of physical uplink control channel resources configured by the network device for the UE.

The sending module is specifically configured to: if the resource allocation index value is the first-type index value, send the first uplink control information on the target physical uplink control channel resource that is in the first uplink subframe and that is corresponding to the resource allocation index value; or if the resource allocation index value is the second-type index value, skip sending the first uplink control information in the first uplink subframe.

According to a tenth aspect, an embodiment of the present invention provides a network device, including: a sending module, configured to send downlink data to a terminal device UE in each subframe in a first subframe set, where the first subframe set includes N subframes, and each of the N subframes is a downlink full subframe, or M of the N subframes are downlink partial subframes, and N-M of the N subframes are downlink full subframes, where M is less than or equal to N, and both M and N are integers; where the sending module is further configured to send first downlink control information to the UE; and a receiving module, configured to: receive, on a target physical uplink control channel resource in a first uplink subframe, first uplink control information sent by the UE, or skip receiving the first uplink control information on the target physical uplink control channel resource in the first uplink subframe.

In a possible design, the resource allocation index value is indication information in downlink control information corresponding to downlink data in some or all subframes in the first subframe set.

In a possible design, the resource allocation index value is a first-type index value or a second-type index value, the first-type index value is corresponding to an index value of the target physical uplink control channel resource in a reference physical uplink control channel resource set, the second-type index value indicates that there is no target physical uplink control channel resource, and the reference physical uplink control channel resource set is a set of physical uplink control channel resources configured by the network device for the UE.

According to an eleventh aspect, an embodiment of the present invention provides a terminal device, including: a receiver, configured to receive downlink data sent by a network device in each subframe in a first subframe set, where the first subframe set includes N subframes, and each of the N subframes is a downlink full subframe, or M of the N subframes are downlink partial subframes, and N-M of the N subframes are downlink full subframes, where M is less than or equal to N, and both M and N are integers; where the receiver is further configured to obtain first downlink control information sent by the network device; and a transmitter, configured to determine, based on a resource allocation index value, whether to send first uplink control information on a target physical uplink control channel resource in a first uplink subframe according to an indication of the first downlink control information, where the resource allocation index value is used by the UE to determine the target physical uplink control channel resource, and the first uplink control information includes hybrid automatic repeat request acknowledgement information corresponding to the downlink data that is in each subframe in the first subframe set and that is received by the UE.

In a possible design, the resource allocation index value is indication information in downlink control information corresponding to downlink data in some or all subframes in the first subframe set.

In a possible design, the resource allocation index value is a first-type index value or a second-type index value, the first-type index value is corresponding to an index value of the target physical uplink control channel resource in a reference physical uplink control channel resource set, the second-type index value indicates that there is no target physical uplink control channel resource, and the reference physical uplink control channel resource set is a set of physical uplink control channel resources configured by the network device for the UE.

The transmitter is specifically configured to: if the resource allocation index value is the first-type index value, send the first uplink control information on the target physical uplink control channel resource that is in the first uplink subframe and that is corresponding to the resource allocation index value; or if the resource allocation index value is the second-type index value, skip sending the first uplink control information in the first uplink subframe.

According to a twelfth aspect, an embodiment of the present invention provides a network device, including: a transmitter, configured to send downlink data to a terminal device UE in each subframe in a first subframe set, where the first subframe set includes N subframes, and each of the N subframes is a downlink full subframe, or M of the N subframes are downlink partial subframes, and N-M of the N subframes are downlink full subframes, where M is less than or equal to N, and both M and N are integers; where the transmitter is further configured to send first downlink control information to the UE; and a receiver, configured to: receive, on a target physical uplink control channel resource in a first uplink subframe, first uplink control information sent by the UE, or skip receiving the first uplink control information on the target physical uplink control channel resource in the first uplink subframe.

In a possible design, the resource allocation index value is indication information in downlink control information corresponding to downlink data in some or all subframes in the first subframe set.

In a possible design, the resource allocation index value is a first-type index value or a second-type index value, the first-type index value is corresponding to an index value of the target physical uplink control channel resource in a reference physical uplink control channel resource set, the second-type index value indicates that there is no target physical uplink control channel resource, and the reference physical uplink control channel resource set is a set of physical uplink control channel resources configured by the network device for the UE.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions in the embodiments of the present invention may be applied to various communications systems in a wireless cellular network, such as a Global System for Mobile Communications (GSM), a Code Division Multiple Access (CDMA) system, a Wideband Code Division Multiple Access (WCDMA) system, a general packet radio service (GPRS) system, an LTE system, and a Universal Mobile Telecommunication System (UMTS), and this is not limited in the embodiments of the present invention.

The technical solutions in the embodiments of the present invention are mainly applied to the LTE system, and in particular, to a system for sending uplink data on a unlicensed spectrum resource. In the communications system to which the embodiments of the present invention are applied, network elements include a base station (also referred to as a network device) and a terminal device (e.g. UE).

An uplink control channel sending method, an uplink control channel receiving method, and an apparatus provided in the embodiments of the present invention are used to resolve problems of how the UE sends a physical uplink control channel on a unlicensed spectrum resource and how the UE determines, when sending the physical uplink control channel, a resource for sending the physical uplink control channel and a power adjustment value for sending the physical uplink control channel. The following describes in detail the technical solutions provided in the embodiments of the present invention with reference to the accompanying drawings.

Figure 1:
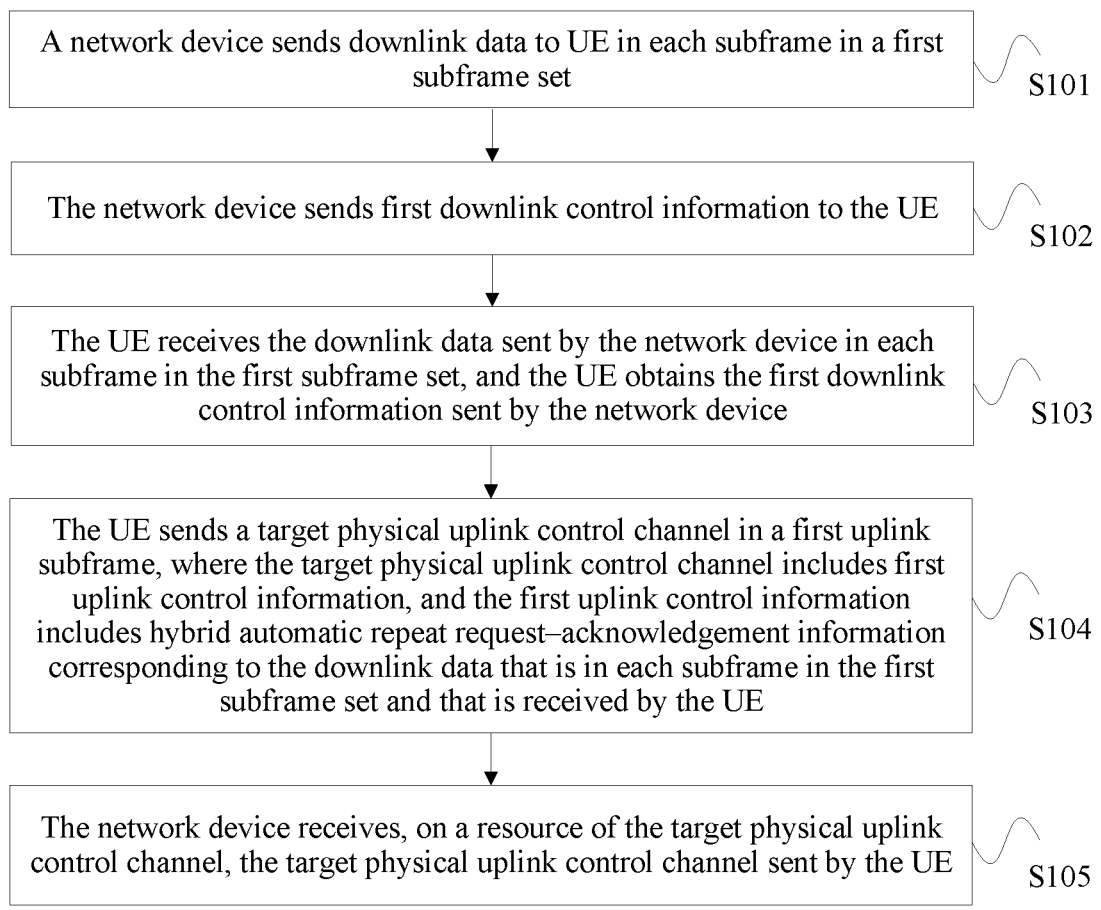
FIG. 1 is a schematic flowchart of Embodiment 1 of an uplink control channel sending and receiving method according to the present invention.

FIG. 1 is a schematic flowchart of Embodiment 1 of an uplink control channel sending and receiving method according to the present invention. As shown in FIG. 1, the method includes the following steps.

S101. A network device sends downlink data to UE in each subframe in a first subframe set, where the first subframe set includes N subframes, and each of the N subframes is a downlink full subframe, or M of the N subframes are downlink partial subframes, and N-M of the N subframes are downlink full subframes, where M is less than or equal to N, and both M and N are integers.

The downlink full subframe is a subframe in which the downlink data sent by the network device to the UE occupies all symbols in the subframe, and the downlink partial subframe is a subframe in which the downlink data sent by the network device to the UE occupies some but not all symbols in the subframe. The network device sends the downlink data to the UE in N subframes in one or more downlink bursts (DL Burst), and the N subframes may be consecutive or not consecutive. The network device sends the downlink data to the UE in each subframe in the first subframe set based on a time of each downlink burst. The first subframe set includes N subframes, and each of the N subframes is a downlink full subframe, or M of the N subframes are downlink partial subframes, and N-M of the N subframes are downlink full subframes, where M is less than or equal to N, and both M and N are integers.

A downlink burst means that a plurality of subframes are continuously occupied in terms of time. For example, after a base station (for example, an eNB) or a cell of the base station preempts an unlicensed spectrum resource, the unlicensed spectrum resource is used for data transmission without a contention mechanism (for example, LBT). A time length of a downlink burst is less than or equal to a maximum time for continuous transmission by the base station (or the cell) on the unlicensed spectrum resource without the contention mechanism, and the maximum time may also be referred to as a maximum channel occupied time (MCOT). The MCOT may be related to a local law. For example, in Japan, the MCOT may be equal to 4 ms; in Europe, the MCOT may be equal to 8 ms, 10 ms, or 13 ms. The MCOT may alternatively be related to a contention mechanism used by a listening device (for example, a base station or user equipment). A shorter listening time usually indicates a shorter MCOT. A length of the MCOT may alternatively be related to a service class in data transmission. For example, for an Internet telephone service, if a priority of the service is higher, the MCOT may be usually 2 ms. Therefore, after the base station obtains the unlicensed spectrum resource through contention, the base station may continuously occupy the unlicensed spectrum resource 2 milliseconds. For example, for a data transmission service, if a priority of the service is lower, the base station may usually continuously occupy the unlicensed spectrum resource 8 or 10 milliseconds.

S102. The network device sends first downlink control information to the UE.

The first downlink control information is used to instruct the UE to send a target physical uplink control channel in a first uplink subframe. The first downlink control information may be first-type downlink control information or second-type downlink control information. The first-type downlink control information is UE-specific physical downlink control information (downlink control information unicasted by the network device), and the second-type downlink control information is UE-group-specific physical downlink control information or common physical downlink control information (downlink control information broadcasted by the network device). For example, the first-type downlink control information is UE-specific control information, the control information is added to CRC check information before being encoded, and the CRC check information is scrambled by using a UE-specific RNTI in the CRC check information. Only specific UE can receive and demodulate the first-type downlink control information. For example, the first-type downlink control information is scheduling indication information of a physical uplink control channel, and the downlink control information is used by the network device to instruct the UE to send the physical uplink control channel. The second-type downlink control information is common physical downlink control information. For example, the second-type downlink control information is a C-PDCCH, control information in the C-PDCCH is added to CRC check information before being encoded, and the CRC check information is scrambled by using a cell-specific common radio network temporary identifier (RNTI) in the CRC check information. Each UE served by the network device can receive and demodulate the second-type downlink control information. Alternatively, the second-type downlink control information is UE-group-specific physical downlink control information. For example, control information in the second-type downlink control information is added to CRC check information before being encoded, and the CRC check information is scrambled by using a UE-group-specific RNTI in the CRC check information. Each UE that is served by the network device and for which the UE-group-specific RNTI is preconfigured by the network device can receive and demodulate the second-type downlink control information. For another example, the network device may preconfigure an index number of a UE group to which the UE belongs for the UE, and the first downlink control information sent by the network device includes indication information carrying the index number of the UE group. After the UE receives and demodulates the first downlink control information, if indication information of an index number of a first downlink UE group in the first downlink control information is consistent with the index number that is of the UE group to which the UE belongs and that is configured by the network device for the UE, the UE sends the target physical uplink control channel in the first uplink subframe according to an indication of the first downlink control information. On the contrary, after the UE receives and demodulates the first downlink control information, if the indication information of the index number of the first downlink UE group in the first downlink control information is not consistent with the index number that is of the UE group to which the UE belongs and that is configured by the network device for the UE, the UE does not send the first uplink control information in the first uplink subframe. For example, the second-type downlink control information is cell common physical downlink control information. The downlink control information is used by the network device to instruct the UE to send a physical uplink control channel, and may be further used to indicate, to the UE, that a current subframe is a downlink full subframe or a downlink partial subframe, and/or indicate, to the UE, that a next subframe of a current subframe in a downlink burst is a downlink full subframe or a downlink partial subframe, and/or the like.

Optionally, the first downlink control information includes first indication information. When the first indication information is first information, the first indication information is used to instruct the UE to send the target physical uplink control channel. When the first indication information is second information, the first indication information is used to instruct the UE to send a target physical uplink shared channel, and the target physical uplink shared channel carries uplink data or carries uplink data and hybrid automatic repeat request acknowledgement information. For example, the first information is "1", and the second information is "0", or the first information is "00", and the second information is "11". The network device indicates downlink data scheduling information or uplink data scheduling information to the UE by using downlink control information in different formats. A format of uplink shared data channel scheduling information includes information such as a frequency resource location, a modulation and coding order, a HARQ process number, a redundancy version, and a cyclic shift value of a demodulation reference signal that are used to schedule the UE to send uplink data. In a subframe, the UE detects, through blind detection, downlink control information that may be sent by the network device to the UE. The UE detects received downlink control information in a blind detection process based on different formats. More formats and types of downlink control information blindly detected by the UE indicate higher complexity of blind detection by the UE. To reduce complexity of blind detection by the UE, the first downlink control information sent by the network device to the UE may be in a same format as control information that is sent by the network device to the UE and that is used to schedule the UE to send an uplink shared channel, for example, a first downlink control information format. In this case, the first downlink control information format needs to include the first indication information. When the first indication information is the first information, the UE sends the target physical uplink control channel based on the first downlink control information, and an indication bit of third indication information in the first downlink control information format is used to indicate information such as a resource and a power adjustment value used when the UE sends the target physical uplink control channel. When the first indication information is the second information, the first downlink control information is used to instruct the UE to send the target physical uplink shared channel, the target physical uplink shared channel carries uplink data or carries uplink data and hybrid automatic repeat request acknowledgement information, and an indication bit of third indication information in the first downlink control information format is used to indicate information such as a resource and a power adjustment value used when the UE sends the target physical uplink shared channel. Indication types of the first indication information and the third indication information are shown in the following Table 1. The third indication information is any one or more of third indication information A, third indication information B, and third indication information C in the following table. The first downlink control information format includes other indication information in addition to the first indication information and the third indication information.

first downlink control information, and the other state indicates the second information, that is, instructs the UE to send the target physical uplink shared channel based on the first downlink control information. After obtaining the downlink control information in the first downlink control information format through blind detection, the UE may determine, based on the control field in the downlink control information, whether the first indication information is the first information or the second information, and further correspondingly determine that the downlink control information is used by the network device to instruct the UE to send the target physical uplink control channel or the target physical uplink shared channel. For another example, the first indication information may be scrambling code information that is added to a CRC check bit after the control information in the first downlink control information format is added to the CRC check bit before being encoded. There are two types of scrambling code information: One is a scrambling code A for instructing the UE to send the target physical uplink control channel based on the first downlink control information, and the other is a scrambling code B for instructing the UE to send the target physical uplink shared channel based on the first downlink control information. After obtaining the downlink control information in the first downlink control information format through blind detection, the UE may determine whether the scrambling code A or the scrambling code B is used in the blind detection process. If the UE determines that the scrambling code A is used, the UE determines that the first indication information is the first information, or if the UE determines that the scrambling code B is used, the UE determines that the first indication information is the second information. Further, the UE correspondingly determines that the network device instructs the UE to send the target physical uplink control channel or the target physical uplink shared channel.

S103. The UE receives the downlink data sent by the network device in each subframe in the first subframe set, and the UE obtains the first downlink control information sent by the network device.

As described in S101 and S102, the UE may receive the downlink data sent by the network device to the UE in each subframe in the first subframe set, and obtain the first downlink control information sent by the network device.

TABLE 1

INDICATION TYPES OF THE FIRST INDICATION INFORMATION AND THE THIRD INDICATION INFORMATION
First downlink control information format

| First indication information | First information | Second information |
| --- | --- | --- |
| Third indication information A | Resource block assignment and/or hopping resource allocation of a target physical uplink control channel | Resource block assignment and/or hopping resource allocation of a target physical uplink shared channel |
| Third indication information B | Demodulation reference signal cyclic shift and/or orthogonal code index of a target physical uplink control channel | Demodulation reference signal cyclic shift and/or orthogonal code index of a target physical uplink shared channel |
| Third indication information C | Power adjustment value of a target physical uplink control channel | Power adjustment value of a target physical uplink shared channel |

For example, the first indication information may be a control field in the first downlink control information format. Information in the control field has two states: One state indicates the first information, that is, instructs the UE to send the target physical uplink control channel based on the After obtaining the first downlink control information, the UE sends the target physical uplink control channel in the first uplink subframe according to the indication of the first downlink control information. The target physical uplink control channel sent by the UE includes the first uplink control information, and the first uplink control information includes hybrid automatic repeat request acknowledgement information corresponding to the downlink data that is in each subframe in the first subframe set and that is received by the UE. After receiving the downlink data in each downlink subframe in the first subframe set, the UE determines hybrid automatic repeat request acknowledgement information of each downlink subframe through demodulation, decoding, or the like. For a downlink subframe in which downlink data is correctly received, corresponding hybrid automatic repeat request acknowledgement information is acknowledgement (ACK) information. For a downlink subframe in which downlink data is not correctly received, corresponding hybrid automatic repeat request acknowledgement information is negative acknowledgement (NACK) information. The ACK information and the NACK information are collectively referred to as hybrid automatic repeat request acknowledgement information. Optionally, in addition to the HARQ-ACK information corresponding to the downlink data that is in each subframe in the first subframe set and that is received by the UE, the first uplink control information may include at least one of channel state information and uplink scheduling request status information. The uplink scheduling request status information herein is a state in which the UE requests uplink scheduling or a state in which the UE does not request uplink scheduling. Preferably, in addition to the HARQ-ACK information corresponding to the downlink data that is in each subframe in the first subframe set and that is received by the UE, the first uplink control information may include at least one of periodic channel state information and uplink scheduling request status information, but does not include aperiodic channel state information.

The UE sends the target physical uplink control channel in the first uplink subframe according to the indication of the first downlink control information. A resource of the target physical uplink control channel may be a physical uplink control channel resource in a preconfigured physical uplink control channel resource set; or a resource of the target physical uplink control channel is a control channel resource scheduled by using control channel resource scheduling information, and the control channel resource scheduling information is information in the first downlink control information.

(1) If the resource of the target physical uplink control channel is a resource scheduled by using physical uplink control channel scheduling information, the control channel resource scheduling information is information in the first downlink control information. For example, the network device sends a frequency location occupied by the target physical uplink control channel, an orthogonal code resource index, and the like to the UE by adding the frequency location, the orthogonal code resource index, and the like to the first downlink control information. After receiving the first downlink control information, the UE may determine that the resource of the target physical uplink control channel is an uplink control channel resource indicated by the first downlink control information, and send the first uplink control information on the resource of the target physical uplink control channel. As described in S102, the first downlink control information uses the first downlink control information format. When the first indication information is the first information, the UE sends the target physical uplink control channel based on the first downlink control information, and an indication bit of third indication information in the first downlink control information format is used to indicate information used when the UE sends the target physical uplink control channel. For example, as described in S102, the UE may determine a resource block assignment result and/or a hopping resource allocation result of the target physical uplink control channel by using the third indication information A in the first downlink control information, and/or determine a demodulation reference signal cyclic shift and/or an orthogonal code index of the target physical uplink control channel by using the third indication information B in the first downlink control information, and/or determine a power adjustment value of the target physical uplink control channel by using the third indication information C in the first downlink control information.

(2) If the resource of the target physical uplink control channel is a physical uplink control channel resource in a preconfigured physical uplink control channel resource set, a process in which the UE determines, based on the first downlink control information, the resource of the target physical uplink control channel is: the UE determines fourth indication information included in the first downlink control information. The fourth indication information is used to indicate control channel resource index indication information, the resource of the target physical uplink control channel is a channel resource identified by the control channel resource index indication information, and the control channel resource index indication information is used to identify an index value of the resource of the target physical uplink control channel in the preconfigured physical uplink control channel resource set. For example, the preconfigured physical uplink control channel resource set includes four physical uplink control channel resources: a physical uplink control channel resource A, a physical uplink control channel resource B, a physical uplink control channel resource C, and a physical uplink control channel resource D. The four physical uplink control channel resources are a physical uplink control channel resource 1, a physical uplink control channel resource 2, a physical uplink control channel resource 3, and a physical uplink control channel resource 4. The control channel resource index indication information indicated by the fourth indication information indicates, to the UE, which physical uplink control channel resource in a reference physical uplink control channel resource set is the resource of the target physical uplink control channel.

Optionally, the network device may use at least one of the first-type downlink control information and the second-type downlink control information to instruct the UE to send the target physical uplink control channel. The first-type downlink control information is UE-specific physical downlink control information, and the second-type downlink control information is UE-group-specific physical downlink control information or common physical downlink control information. The first downlink control information is the first-type downlink control information, and the resource of the target physical uplink control channel is a physical uplink control channel resource in a first physical uplink control channel resource set; or the first downlink control information is the second-type downlink control information, and the resource of the target physical uplink control channel is a physical uplink control channel resource in a second physical uplink control channel resource set. Each of the first physical uplink control channel resource set and the second physical uplink control channel resource set is a set of physical uplink control channel resources configured by the network device for the UE. The first physical uplink control channel resource set is corresponding to the first-type downlink control information, and the second physical uplink control channel resource set is corresponding to the second-type downlink control information. Further, the first physical uplink control channel resource set and the second physical uplink control channel resource set are sets separately configured by the network device for the UE, or the first physical uplink control channel resource set is a set configured by the network device for the UE, and the second physical uplink control channel resource set is a subset of the first physical uplink control channel resource set.

For example, the first physical uplink control channel resource set preconfigured by the network device for the UE is a set of the physical uplink control channel resource 1 and the physical uplink control channel resource 2. The first downlink control information sent by the network device to the UE includes information indicating whether the resource of the target physical uplink control channel is the physical uplink control channel resource 1 or the physical uplink control channel resource 2. After receiving the first downlink control information, the UE may determine the resource of the target physical uplink control channel, and send the first uplink control information on the resource of the target physical uplink control channel.

If the first downlink control information is the second-type downlink control information, the first downlink control information may be received by a plurality of UEs, and each of the plurality of UEs sends a target physical uplink control channel according to the indication of the first downlink control information. In this case, each of the plurality of UEs needs to determine a respective target physical uplink control channel. If an index of a target physical uplink control channel of each UE is indicated to each UE in the first downlink control information, heavy physical layer signaling overheads are caused. Therefore, for the second-type first downlink control information, the resource that is of the target physical uplink control channel and that is corresponding to the first downlink control information is an uplink control channel resource in the second physical uplink control channel resource set configured by the network device for the UE. Preferably, the network device may configure the first physical uplink control channel resource set including at least two physical uplink control channel resources but configure the second physical uplink control channel resource set including only one physical uplink control channel resource. In this case, after receiving the second-type first downlink control information, the UE does not need to determine the index value of the resource of the target physical uplink control channel in the second physical uplink control channel resource set, but the UE sends the first uplink control information on a physical uplink control channel resource included in the second physical uplink control channel resource set. The network device may separately configure the first physical uplink control channel resource set and the second physical uplink control channel resource set for the UE. The first physical uplink control channel resource set and the second physical uplink control channel resource set are respectively corresponding to the first-type downlink control information and the second-type downlink control information. Alternatively, the network device may configure the first physical uplink control channel resource set for the UE, and the first physical uplink control channel resource set is corresponding to the first-type downlink control information. The first physical uplink control channel resource set includes at least two physical uplink control channel resources. In addition, the network device and the UE preset that a physical uplink control channel resource with an index value J in the first physical uplink control channel resource set is a physical uplink channel resource included in the second physical uplink control channel resource set, where J is a fixed value.

Further, in the foregoing method, the second physical uplink control channel resource set may be an empty set. That is, the network device may not configure the second physical uplink control channel resource set for the UE. Alternatively, whether the UE is allowed to send the target physical uplink control channel in the first uplink subframe based on the second-type first downlink control information is configured by the network device for the UE by using a configuration parameter. If the UE is allowed to send the target physical uplink control channel in the first uplink subframe based on the second-type first downlink control information, the network device configures the second physical uplink control channel resource set for the UE. If the UE is not allowed to send the target physical uplink control channel in the first uplink subframe based on the second-type first downlink control information, the network device does not configure the second physical uplink control channel resource set for the UE, that is, the second physical uplink control channel resource set may be an empty set. If the UE determines that the second physical uplink control channel resource set is an empty set, the UE does not send the first uplink control information in the first uplink subframe even if the UE receives the second-type first downlink control information. The UE can send the target physical uplink control channel in the first uplink subframe according to the indication of the first downlink control information only when the UE receives the second-type first downlink control information and the second physical uplink control channel resource set is not an empty set.

Optionally, the first uplink subframe includes a first-type uplink subframe and a second-type uplink subframe. The first-type uplink subframe is an uplink subframe in which a physical uplink control channel sent by the UE occupies R symbols, and the second-type uplink subframe is an uplink subframe in which a physical uplink control channel sent by the UE occupies fewer than R symbols, where R is an integer. The target physical uplink control channel sent by the UE may occupy R symbols in the first uplink subframe, or may occupy resources of fewer than R symbols in the first uplink subframe. For example, R=14. If at least one UE that sends a physical uplink control channel in the first uplink subframe needs to perform clear channel assessment within a time of a first symbol in the first uplink subframe, all UEs that send physical uplink control channels by using a same time-frequency resource in the first uplink subframe as the UE can send the physical uplink control channels only by occupying a resource of a symbol other than the first symbol in the first uplink subframe. In other words, the UEs send the physical uplink control channels by occupying fewer than 14 symbols. However, if all the UEs that send the physical uplink control channels in the first uplink subframe do not need to perform clear channel assessment within the time of the first symbol in the first uplink subframe, the UEs send the physical uplink control channels by occupying 14 symbols. For another example, if a last symbol in the first uplink subframe needs to be reserved for another communications device to perform clear channel assessment, the UE can send the physical uplink control channel in the first uplink subframe only by occupying a resource of a symbol other than the last symbol. However, if all the UEs that send the physical uplink control channels in the first uplink subframe do not need to reserve, in a time of the last symbol in the first uplink subframe, a time for another device to perform clear channel assessment, the UEs send the physical uplink control channels by occupying 14 symbols. Alternatively, if the first symbol in the first uplink subframe needs to be reserved for at least UE sending a physical uplink control channel to perform clear channel assessment, and the last symbol in the first uplink subframe needs to be reserved for another device to perform clear channel assessment or needs to be reserved for another device to send a sounding reference signal, the UE can send the physical uplink control channel in the first uplink subframe only by occupying a resource of a symbol other than the first symbol and the last symbol.

The time-frequency resource for sending the physical uplink control channel by the UE may be multiplexed by a plurality of UEs to send uplink control information. For example, W UEs may multiplex a same time-frequency resource in an orthogonal code division manner to send uplink control information. In the first-type uplink subframe, W=V1, and in the second-type uplink subframe, W=V2. Herein, V1 is less than V2. For example, V1=5 and V2=4. If a number of a physical uplink control channel resource configured by the network device for the UE is X, the UE determines, based on the configuration information, that an index number of a resource block location of the configured physical uplink control channel resource is $m=\lfloor X/5 \rfloor$, that is, an $(m+1)^{th}$ resource block in the uplink subframe, and the UE determines, based on the configuration information, that an orthogonal code resource index of the configured physical uplink control channel resource is X mod W. In the first-type uplink subframe, a maximum of five UEs may multiplex a same time-frequency resource in an orthogonal code division manner to send uplink control information, and orthogonal code resource indexes of physical uplink control channel resources configured for the five UEs are 0, 1, 2, 3, and 4. It is assumed that a physical uplink control channel resource with an orthogonal code resource index 0 is configured for UE1, and a physical uplink control channel resource with an orthogonal code resource index 4 is configured for UE2. If the UE1 and the UE2 simultaneously send physical uplink control channels in the second-type uplink subframe, according to the foregoing rule, both the UE1 and the UE2 learn, by using X mod W through calculation, that each of orthogonal code resource indexes of physical uplink control channel resources configured for sending the physical uplink control channels in the second-type uplink subframe is 0. In this case, the UE1 and the UE2 use the completely same physical uplink control channel resource to send uplink control information, and the uplink control information sent by the two UEs interfere with each other. Consequently, both the UE1 and the UE2 fail to send the uplink control information.

This embodiment provides a method. When the first uplink subframe is the first-type uplink subframe, the resource that is of the target physical uplink control channel and that is corresponding to the first downlink control information is an uplink control channel resource in a third physical uplink control channel resource set configured by the network device for the UE. When the first uplink subframe is the second-type uplink subframe, the resource that is of the target physical uplink control channel and that is corresponding to the first downlink control information is an uplink control channel resource in a fourth physical uplink control channel resource set configured by the network device for the UE. The network device may configure the third physical uplink control channel resource set including at least one physical uplink control channel resource and configure the fourth physical uplink control channel resource set including at least one physical uplink control channel resource. The network device may separately configure the third physical uplink control channel resource set and the fourth physical uplink control channel resource set for the UE. The third physical uplink control channel resource set and the fourth physical uplink control channel resource set are respectively corresponding to the first-type uplink subframe and the second-type uplink subframe. Further, the third physical uplink control channel resource set and the fourth physical uplink control channel resource set are sets separately configured by the network device for the UE. Alternatively, the network device may configure the third physical uplink control channel resource set for the UE, and the third physical uplink control channel resource set is corresponding to the first-type uplink subframe. The third physical uplink control channel resource set includes at least two physical uplink control channel resources. In addition, the network device and the UE preset that a physical uplink control channel resource with an index value I in the third physical uplink control channel resource set belongs to the fourth physical uplink control channel resource set, where I is a fixed value.

The first downlink control information sent by the network device to the UE includes information indicating that the third physical uplink control channel resource set preconfigured by the network device for the UE is a set of the physical uplink control channel resource 1 and the physical uplink control channel resource 2. The first downlink control information sent by the network device to the UE includes information indicating whether the resource of the target physical uplink control channel is the physical uplink control channel resource 1 or the physical uplink control channel resource 2. After the UE receives the first downlink control information, if the UE determines that the first uplink subframe is the first-type uplink subframe, the UE may determine the resource of the target physical uplink control channel in the third physical uplink control channel resource set according to the indication of the first downlink control information, and send the first uplink control information on the resource of the target physical uplink control channel.

Preferably, the third physical uplink control channel resource set includes only one physical uplink control channel resource, and the fourth physical uplink control channel resource set includes only one physical uplink control channel resource. Preferably, the third physical uplink control channel resource set is corresponding to the second-type downlink control information in addition to the first-type uplink subframe, and the fourth physical uplink control channel resource set is corresponding to the second-type downlink control information in addition to the second-type uplink subframe.

When the first uplink subframe is the first-type uplink subframe, the UE sends the target physical uplink control channel in the first uplink subframe according to the indication of the first downlink control information, and the target physical uplink control channel is a physical uplink control channel resource in the third physical uplink control channel resource set. When the first uplink subframe is the second-type uplink subframe, the UE sends the target physical uplink control channel in the first uplink subframe according to the indication of the first downlink control information, and the target physical uplink control channel is a physical uplink control channel resource in the fourth physical uplink control channel resource set. In this embodiment of the present invention, a method for determining, by the UE, whether the first uplink subframe is the first-type uplink subframe or the second-type uplink subframe is not limited. In this method, the network device may configure a physical uplink control channel resource X1 in the third physical uplink control channel resource set for the UE, and configure a physical uplink control channel resource X2 in the fourth physical uplink control channel resource set for the UE. In the first-type uplink subframe, a maximum of five UEs may multiplex a same time-frequency resource in an orthogonal code division manner to send uplink control information, and orthogonal code resource indexes of physical uplink control channel resources configured for the five UEs are 0, 1, 2, 3, and 4. The UE may obtain, by using X1 through calculation, an orthogonal code resource index of a physical uplink control channel resource configured for sending a physical uplink control channel in the first-type uplink subframe. In the second-type uplink subframe, a maximum of four UEs may multiplex a same time-frequency resource in an orthogonal code division manner to send uplink control information, and orthogonal code resource indexes of physical uplink control channel resources configured for the four UEs are 0, 1, 2, and 3. The UE may obtain, by using X2 through calculation, an orthogonal code resource index of a physical uplink control channel resource configured for sending a physical uplink control channel in the second-type uplink subframe. In this way, a case can be avoided in which both the UE1 and the UE2 fail to send the uplink control information because the UE1 and the UE2 use the completely same physical uplink control channel resource to send the uplink control information.

Further, in the foregoing method, the fourth physical uplink control channel resource set may be an empty set. That is, the network device may not configure the fourth physical uplink control channel resource set for the UE. Alternatively, whether the UE sends the target physical uplink control channel in the second-type uplink subframe is configured by the network device for the UE by using a configuration parameter. If the UE is allowed to send the target physical uplink control channel in the second-type uplink subframe, the network device configures the fourth physical uplink control channel resource set for the UE. If the UE is not allowed to send the target physical uplink control channel in the second-type uplink subframe, the network device does not configure the fourth physical uplink control channel resource set for the UE, that is, the fourth physical uplink control channel resource set may be an empty set. If the UE determines that the fourth physical uplink control channel resource set is an empty set, when the first uplink subframe is the second-type uplink subframe, the UE does not send the first uplink control information in the first uplink subframe even if the UE receives the first downlink control information. Further, preferably, the fourth physical uplink control channel resource set is corresponding to the second-type downlink control information in addition to the second-type uplink subframe. If the UE determines that the fourth physical uplink control channel resource set is an empty set, when the first uplink subframe is the second-type uplink subframe and the first downlink control information received by the UE is the second-type downlink control information, the UE does not send the first uplink control information in the first uplink subframe.

S104. The UE sends a target physical uplink control channel in a first uplink subframe, where the target physical uplink control channel includes first uplink control information, and the first uplink control information includes hybrid automatic repeat request acknowledgement information corresponding to the downlink data that is in each subframe in the first subframe set and that is received by the UE.

The first downlink control information instructs the UE to send the target physical uplink control channel, and after determining the resource of the target physical uplink control channel, the UE sends the first uplink control information on the resource of the target physical uplink control channel. The first uplink control information includes the hybrid automatic repeat request acknowledgement information corresponding to the downlink data that is in each subframe in the first subframe set and that is received by the UE. Further, the UE may further send at least one of channel state information and uplink scheduling request status information on the resource of the target physical uplink control channel based on a configuration or an instruction of the network device. The uplink scheduling request status information herein is a state in which the UE requests uplink scheduling or a state in which the UE does not request uplink scheduling. Preferably, in addition to the HARQ-ACK information corresponding to the downlink data that is in each subframe in the first subframe set and that is received by the UE, the first uplink control information may include at least one of periodic channel state information and uplink scheduling request status information, but does not include aperiodic channel state information.

Optionally, the UE sends the first uplink control information on the resource of the target physical uplink control channel in the first uplink subframe. Transmit power of the resource of the target physical uplink control channel includes a power adjustment amount corresponding to a first power adjustment value. The first power adjustment value is indicated to the UE by using second indication information included in the first downlink control information. The transmit power P for sending the target physical uplink control channel by the UE is determined by a plurality of power adjustment amounts. For example, $$P = \sum_{i=1}^{c} P_i,$$

where c is a quantity of power adjustment values, the first power adjustment value herein is $P_z$, and z is a value meeting $1 \leq z \leq c$. The network device indicates the first power adjustment value to the UE by using the second indication information in the first downlink control information, and the UE may adjust the transmit power of the target physical uplink control channel based on the first power adjustment value. That is, the transmit power for sending the target physical uplink control channel by the UE includes the power adjustment amount indicated by the first power adjustment value. The UE sends the first uplink control information on the resource of the target physical uplink control channel in the first uplink subframe, and a subframe location of the first uplink subframe is corresponding to a subframe location for sending the first downlink control information by the network device. For example, if a corresponding subframe for sending the first downlink control information by the network device is a subframe n, the first uplink subframe is a subframe n+x, where x is a preset value. Alternatively, the subframe location of the first uplink subframe is corresponding to indication information in the first downlink control information, and the UE may determine a value of x according to the indication information in the first downlink control information. The first downlink control information may be first-type downlink control information or second-type downlink control information. Preferably, the first downlink control information is the first-type downlink control information. Herein, the first-type downlink control information is UE-specific physical downlink control information, and the second-type downlink control information is UE-group-specific physical downlink control information or common physical downlink control information. A carrier for sending the first downlink control information by the network device may be the same as or different from a carrier on which the target physical uplink control channel corresponding to the first downlink control information is located. In addition, the network device sends the target physical uplink control channel in the first uplink subframe according to the indication of the first downlink control information. If the target physical uplink control channel is a channel on a carrier on a unlicensed spectrum, before sending the target physical uplink control channel, the UE needs to determine, in a clear channel assessment process, a resource that can be occupied on the target physical uplink control channel. If a result of the clear channel assessment is that the UE cannot occupy the resource of the target physical uplink control channel, the UE does not send the target physical uplink control channel. That is, the subframe location of the first uplink subframe is corresponding to the subframe location for sending the first downlink control information by the network device, or the subframe location of the first uplink subframe is corresponding to the indication information in the first downlink control information. Before sending the target physical uplink control channel in the first uplink subframe, the UE determines, in the clear channel assessment process, the resource that can be occupied on the target physical uplink control channel.

In a communications system in the prior art, when a carrier configuration set includes more than one carrier, a carrier on which the target physical uplink control channel sent by the UE is located is preconfigured by the network device for the UE, and the network device only needs to send, to the UE, a transmit power adjustment amount for sending the target physical uplink control channel on the preset carrier. The network device indicates the transmit power adjustment amount to the UE by using indication information in downlink control information corresponding to downlink data sent on the preset carrier, so that the UE adjusts, based on the transmit power adjustment amount, the transmit power for sending the target physical uplink control channel. Alternatively, the network device indicates the transmit power adjustment amount to the UE by using indication information in downlink control information corresponding to a first piece of downlink data that is within a downlink HARQ-ACK window and that is sent on the preset carrier, so that the UE adjusts, based on the transmit power adjustment amount, the transmit power for sending the target physical uplink control channel.

However, in a unlicensed spectrum communications system, a possible scenario is that the carrier on which the target physical uplink control channel sent by the UE is located dynamically varies between a plurality of carriers in the carrier configuration set preconfigured by the network device for the UE. That is, in an $i^{th}$ subframe, the carrier on which the target physical uplink control channel sent by the UE is located is a carrier 1, but in an $(i+1)^{th}$ subframe, the carrier on which the sent target physical uplink control channel is located is a carrier 2. The carrier 1 and the carrier 2 are different carriers. Because power requirements for sending the target physical uplink control channel on different carriers by the UE are different, the network device needs to send, to the UE, a transmit power adjustment amount for sending the target physical uplink control channel on each carrier in the carrier configuration set. The carrier configuration set herein is a set of carriers that are configured for the UE to communicate with the network device, and the UE may send the target physical uplink control channel on any carrier in the carrier configuration set. This embodiment of the present invention provides a method:

The UE sends the first uplink control information on the resource of the target physical uplink control channel in the first uplink subframe. The transmit power of the resource of the target physical uplink control channel includes a power adjustment amount corresponding to a second power adjustment value. The second power adjustment value is a power adjustment value determined by the UE according to an indication value of a power adjustment field in each piece of downlink control information included in a first control information group, and the first control information group includes downlink control information corresponding to downlink data in each subframe in a second subframe set. Herein, the second subframe set is a set of subframes in the first subframe set that are located on a first carrier, or the second subframe set is a set of subframes that are in the first subframe set and in which downlink data corresponds to downlink control information that is located on the first carrier. The first carrier is a carrier on which the target physical uplink control channel is located, or the first carrier is a carrier for sending the first downlink control information by the network device.

Optionally, the first carrier is a carrier in the carrier configuration set. Herein, the carrier configuration set is a set of carriers configured for the UE to communicate with the network device, and the carrier configuration set includes H carriers. The first carrier is a $G^{th}$ carrier in the carrier configuration set, where both G and H are positive integers, $H \geq 2$, $1 \leq G \leq H$, and a value of G can vary in all subframes.

Because the carrier on which the target physical uplink control channel sent by the UE is located may dynamically vary between carriers configured for the UE, downlink control information corresponding to different downlink data in the first subframe set is used to separately indicate a power adjustment amount for sending the target physical uplink control channel on each carrier by the UE, so that different power requirements for sending the target physical uplink control channel on different carriers by the UE can be met.

The network device sends, in downlink control information on the carrier on which the target physical uplink control channel is located or the carrier on which the first downlink control information sent by the network device is located, the power adjustment amount for the target physical uplink control channel, so that a requirement for adjusting the transmit power of the target physical uplink control channel by the UE can be met.

Figure 2:
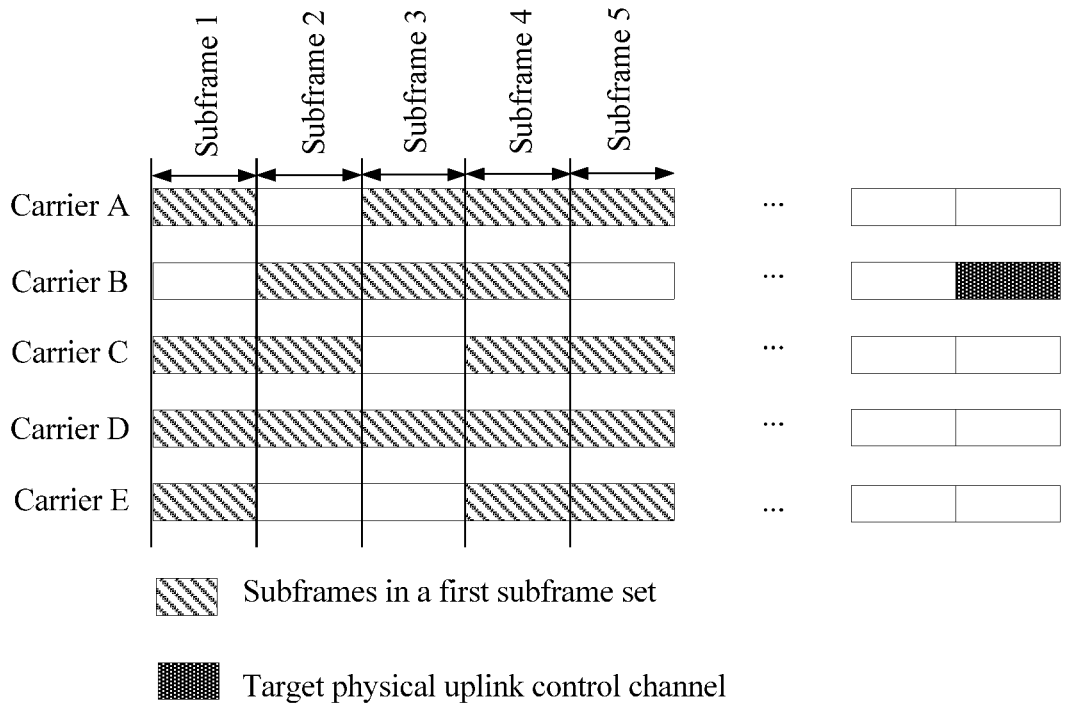
FIG. 2 is a schematic diagram of a first subframe set and a target physical uplink control channel according to an embodiment.

FIG. 2 is a schematic diagram of the first subframe set and the target physical uplink control channel in this embodiment. As shown in FIG. 2, for example, a plurality of carriers are configured for the UE to communicate with the network device, such as a carrier A, a carrier B, a carrier C, a carrier D, and a carrier E. The first subframe set includes subframes A-1, A-3, A-4, and A-5 on the carrier A, subframes B-2, B-3, and B-4 on the carrier B, subframes C-1, C-2, C-4, and C-5 on the carrier C, subframes D-1, D-2, D-3, D-4, and D-5 on the carrier D, and subframes E-1, E-4, and E-5 on the carrier E. The subframe A-1, the subframe B-1, the subframe C-1, the subframe D-1, and the subframe E-1 are subframes indicating same time. The subframe A-2, the subframe B-2, the subframe C-2, the subframe D-2, and the subframe E-2 are subframes indicating same time. The subframe A-3, the subframe B-3, the subframe C-3, the subframe D-3, and the subframe E-3 are subframes indicating same time. The subframe A-4, the subframe B-4, the subframe C-4, the subframe D-4, and the subframe E-4 are subframes indicating same time. The subframe A-5, the subframe B-5, the subframe C-5, the subframe D-5, and the subframe E-5 are subframes indicating same time. Subframes indicating same time are subframes that are consistent in terms of time.

The resource of the target physical uplink control channel sent by the UE in the first uplink subframe may be located on any one of the carrier A, the carrier B, the carrier C, the carrier D, and the carrier E. In addition, the carrier on which the resource of the target uplink physical uplink control channel is located may dynamically vary. For example, the carrier on which the resource of the target physical uplink control channel is located can vary in all subframes. For example, the first downlink control information is used to instruct the UE to send the target physical uplink control channel in the first uplink subframe, and the first downlink control information may include indication information indicating a specific carrier in the first uplink subframe on which the UE sends target uplink control information. The first downlink control information may indicate the carrier on which the target physical uplink control channel is located, and may support the carrier on which the target physical uplink control channel sent by the UE is located in varying in all subframes.

It is assumed that the target physical uplink control channel in the first uplink subframe is located on the carrier B. The first carrier is the carrier on which the target physical uplink control channel is located, in other words, the first carrier is the carrier B. The first control information group includes the downlink control information corresponding to the downlink data in each subframe in the second subframe set.

The second subframe set may be any one of the following cases:

In a first case, the second subframe set is equivalent to the first subframe set. The second subframe set is a subframe in which all downlink data corresponding to hybrid automatic repeat request acknowledgement information included in the target physical uplink control channel sent by the UE in the first uplink subframe is located. In the foregoing example, the first control information group includes downlink control information corresponding to all downlink data in all first subframes. That is, the first control information group includes downlink control information corresponding to downlink data in subframes A-1, A-3, A-4, A-5, B-2, B-3, B-4, C-1, C-2, C-4, C-5, D-1, D-2, D-3, D-4, D-5, E-1, E-4, and E-5. Each piece of downlink control information carries a power adjustment amount. The power adjustment amount corresponding to the second power adjustment value is determined by power adjustment amounts indicated by all or some downlink control information in the first control information group.

In a second case, the second subframe set is a set of subframes in the first subframe set that are located on the first carrier. In the foregoing example, because the first carrier is the carrier B, the first control information group includes downlink control information corresponding to downlink data in subframes B-2, B-3, and B-4 on the carrier B. Each piece of downlink control information carries a power adjustment amount. The power adjustment amount corresponding to the second power adjustment value is determined by power adjustment amounts carried in all or some downlink control information in the first control information group.

In a third case, the second subframe set is a set of subframes that are in the first subframe set and in which downlink data corresponds to downlink control information that is located on the first carrier. In the foregoing example, because the first carrier is the carrier B, the first control information group includes downlink control information corresponding to a subframe on the carrier B on which downlink control information corresponding to downlink data in subframes A-1, A-3, A-4, A-5, B-2, B-3, B-4, C-1, C-2, C-4, C-5, D-1, D-2, D-3, D-4, D-5, E-1, E-4, and E-5 is located. For example, downlink control information corresponding to downlink data of the carrier A is located on the carrier A, downlink control information corresponding to downlink data of the carrier B is located on the carrier B, downlink control information corresponding to downlink data of the carrier C is located on the carrier B, downlink control information corresponding to downlink data of the carrier D is located on the carrier A, and downlink control information corresponding to downlink data of the carrier E is located on the carrier E. In this case, the first control information group includes downlink control information corresponding to downlink data in subframes B-2, B-3, and B-4 on the carrier B and subframes C-1, C-2, C-4, and C-5 on the carrier C. Each piece of downlink control information carries a power adjustment amount. The power adjustment amount corresponding to the second power adjustment value is determined by power adjustment amounts carried in all or some downlink control information in the first control information group.

In a fourth case, the second subframe set is a set of subframes in the first subframe set that are located on the first carrier and in which corresponding downlink control information is located on the first carrier. In the foregoing example, because the first carrier is the carrier B, and subframes in which downlink data and corresponding downlink control information are located on the carrier B include subframes B-2, B-3, and B-4, the first control information group includes downlink control information corresponding to downlink data in the subframes B-2, B-3, and B-4. Each piece of downlink control information carries a power adjustment amount. The power adjustment amount corresponding to the second power adjustment value is determined by power adjustment amounts carried in all or some downlink control information in the first control information group.

For another example, it is assumed that the target physical uplink control channel in the first uplink subframe is located on the carrier B, but the first downlink control information sent by the network device is located on the carrier A. The first carrier is a carrier for sending the first downlink control information by the network device, in other words, the first carrier is the carrier A. The first control information group includes the downlink control information corresponding to the downlink data in each subframe in the second subframe set. The second subframe set may be any one of the following cases:

In a first case, the second subframe set is equivalent to the first subframe set. The second subframe set is a subframe in which all downlink data corresponding to hybrid automatic repeat request acknowledgement information included in the target physical uplink control channel sent by the UE in the first uplink subframe is located. In the foregoing example, the first control information group includes downlink control information corresponding to all downlink data. That is, the first control information group includes downlink control information corresponding to downlink data in subframes A-1, A-3, A-4, A-5, B-2, B-3, B-4, C-1, C-2, C-4, C-5, D-1, D-2, D-3, D-4, D-5, E-1, E-4, and E-5. Each piece of downlink control information carries a power adjustment amount. The power adjustment amount corresponding to the second power adjustment value is determined by power adjustment amounts carried in all or some downlink control information in the first control information group.

In a second case, the second subframe set is a set of subframes in the first subframe set that are located on the first carrier. In the foregoing example, because the first carrier is the carrier A, the first control information group includes downlink control information corresponding to downlink data in subframes A-1, A-3, A-4, and A-5. Each piece of downlink control information carries a power adjustment amount. The power adjustment amount corresponding to the second power adjustment value is determined by power adjustment amounts carried in all or some downlink control information in the first control information group.

In a third case, the second subframe set is a set of subframes that are in the first subframe set and in which downlink data corresponds to downlink control information that is located on the first carrier. In the foregoing example, because the first carrier is the carrier A, the first control information group includes downlink control information in a subframe on the carrier A on which downlink control information corresponding to downlink data in subframes A-1, A-3, A-4, A-5, B-2, B-3, B-4, C-1, C-2, C-4, C-5, D-1, D-2, D-3, D-4, D-5, E-1, E-4, and E-5 is located. For example, downlink control information corresponding to downlink data of the carrier A is located on the carrier A, downlink control information corresponding to downlink data of the carrier B is located on the carrier B, downlink control information corresponding to downlink data of the carrier C is located on the carrier B, downlink control information corresponding to downlink data of the carrier D is located on the carrier A, and downlink control information corresponding to downlink data of the carrier E is located on the carrier E. In this case, the first control information group includes downlink control information corresponding to downlink data in subframes A-1, A-3, A-4, A-5, D-1, D-2, D-3, D-4, and D-5. Each piece of downlink control information carries a power adjustment amount. The power adjustment amount corresponding to the second power adjustment value is determined by power adjustment amounts carried in all or some downlink control information in the first control information group.

In a fourth case, the second subframe set is a set of subframes in the first subframe set that are located on the first carrier and in which corresponding downlink control information is located on the first carrier. In the foregoing example, because the first carrier is the carrier A, and subframes in which downlink data and corresponding downlink control information are located on the carrier A include subframes A-1, A-3, A-4, and A-5, the first control information group includes downlink control information corresponding to downlink data in the subframes A-1, A-3, A-4, and A-5. Each piece of downlink control information carries a power adjustment amount. The power adjustment amount corresponding to the second power adjustment value is determined by power adjustment amounts carried in all or some downlink control information in the first control information group.

In this embodiment, because the carrier on which the target physical uplink control channel sent by the UE is located may dynamically vary between carriers configured for the UE, the network device use downlink control information corresponding to different downlink data in the first subframe set to separately indicate a power adjustment amount for sending the target physical uplink control channel on each carrier, so that different power requirements for sending the target physical uplink control channel on different carriers by the UE can be met. Specifically, the network device indicates, in downlink control information on the carrier on which the target physical uplink control channel is located or the carrier on which the first downlink control information sent by the network device is located, the power adjustment amount for sending the target physical uplink control channel, so that a requirement for adjusting the transmit power of the target physical uplink control channel by the UE can be met.

Optionally, indication values of power adjustment fields in downlink control information in subframes indicating same time in the first control information group are the same. For example, the first control information group includes downlink control information in a $T1^{th}$ subframe on the carrier A, a $T2^{th}$ subframe on the carrier A, a $T4^{th}$ subframe on the carrier A, a $T1^{th}$ subframe on the carrier B, and a $T4^{th}$ subframe on the carrier B. Because the $T1^{th}$ subframe on the carrier A and the $T1^{th}$ subframe on the carrier B indicate same time, indication values of power adjustment fields in downlink control information in the $T1^{th}$ subframe on the carrier A and the $T1^{th}$ subframe on the carrier B are the same. Likewise, indication values of power adjustment fields in downlink control information in the $T4^{th}$ subframe on the carrier A and the $T4^{th}$ subframe on the carrier B are the same.

The downlink control information in the first control information group includes downlink control information in k subframe locations, and each of the k subframe locations includes one or more pieces of downlink control information. If a $u^{th}$ subframe location in the k subframe locations includes v pieces of downlink control information, the v pieces of downlink control information may be downlink control information on a same carrier, or may be downlink control information on different carriers. In one case of the foregoing example, the first control information group includes the downlink control information in the $T1^{th}$ subframe on the carrier A, the $T2^{th}$ subframe on the carrier A, the $T4^{th}$ subframe on the carrier A, the $T1^{th}$ subframe on the carrier B, and the $T4^{th}$ subframe on the carrier B. Herein, k=3, that is, the downlink control information in the first control information group includes downlink control information in three subframe locations, and the three subframe locations are the $T1^{th}$ subframe, the $T2^{th}$ subframe, and the $T4^{th}$ subframe. A $T1^{th}$ subframe location includes two pieces of downlink control information, that is, downlink control information in the $T1^{th}$ subframe on the carrier A and downlink control information in the $T1^{th}$ subframe on the carrier B. A $T2^{th}$ subframe location includes one piece of downlink control information, that is, downlink control information in the $T2^{th}$ subframes on the carrier A. A $T4^{th}$ subframe location includes two pieces of downlink control information, that is, downlink control information in the $T4^{th}$ subframe on the carrier A and downlink control information in the $T4^{th}$ subframe on the carrier B.

Optionally, the power adjustment amount corresponding to the second power adjustment value is determined by indication values of power adjustment fields in all or some downlink control information in the first control information group. The following manner may be used: The power adjustment amount corresponding to the second power adjustment value is $$\Delta P = \sum_{i=1}^{k} P_i.$$

The downlink control information in the first control information group includes downlink control information in k subframe locations, each of the k subframe locations includes one or more pieces of downlink control information, and $P_i$ is an indication value of a power adjustment field in control information in an $i^{th}$ subframe location in the first control information group. Indication values of power adjustment fields in downlink control information in a same subframe location are the same. In one case of the foregoing example, if the first control information group includes the downlink control information in the $T1^{th}$ subframe on the carrier A, the $T2^{th}$ subframe on the carrier A, the $T4^{th}$ subframe on the carrier A, the $T1^{th}$ subframe on the carrier B, and the $T4^{th}$ subframe on the carrier B, the power adjustment amount corresponding to the second power adjustment value is $$\Delta P = \sum_{i=1}^{3} P_i,$$

where $P_1$ is an indication value of a power adjustment field in downlink control information in the $T1^{th}$ subframe on the carrier A (in other words, $P_1$ is an indication value of a power adjustment field in downlink control information in the $T1^{th}$ subframe on the carrier B because the two are equivalent), $P_2$ is an indication value of a power adjustment field in downlink control information in the $T2^{th}$ subframe on the carrier A, and $P_3$ is an indication value of a power adjustment field in downlink control information in the $T4^{th}$ subframe on the carrier A (in other words, $P_3$ is an indication value of a power adjustment field in downlink control information in the $T4^{th}$ subframe on the carrier B because the two are equivalent).

Optionally, the power adjustment amount corresponding to the second power adjustment value is determined by indication values of power adjustment fields in all or some downlink control information in the first control information group. The following manner may be used: The power adjustment amount corresponding to the second power adjustment value is determined by an indication value of a power adjustment field in downlink control information in a last subframe location in the first control information group. Herein, in the foregoing example, the first control information group includes the downlink control information in the $T1^{th}$ subframe on the carrier A, the $T2^{th}$ subframe on the carrier A, the $T4^{th}$ subframe on the carrier A, the $T1^{th}$ subframe on the carrier B, and the $T4^{th}$ subframe on the carrier B. If T1<T2<T3<T4, the power adjustment amount corresponding to the second power adjustment value is $\Delta P = P_3$, where $P_3$ is an indication value of a power adjustment field in downlink control information in the $T4^{th}$ subframe on the carrier A (in other words, $P_3$ is an indication value of a power adjustment field in downlink control information in the $T4^{th}$ subframe on the carrier B because the two are equivalent).

Optionally, the power adjustment amount corresponding to the second power adjustment value is determined by indication values of power adjustment fields in all or some downlink control information in the first control information group. The following manner may be used: The power adjustment amount corresponding to the second power adjustment value is determined by an indication value of a power adjustment field in downlink control information in a second control information group, and the second control information group is a subset of the first control information group. Specifically, the second control information group is a set of downlink control information in a subframe location succeeding a second uplink subframe in terms of time in the first control information group. The second uplink subframe herein is a subframe in which the UE sends a second physical uplink control channel. The second uplink subframe is before the first uplink subframe, and the UE does not send another physical uplink control channel between the second uplink subframe and the first uplink subframe.

S105. The network device receives, on a resource of the target physical uplink control channel, the target physical uplink control channel sent by the UE.

After sending the downlink data to the UE in each subframe in the first subframe set, and sending the first uplink control information to the UE, the network device correspondingly receives the target physical uplink control channel sent by the UE. The target physical uplink control channel includes the first uplink control information sent by the UE. The first uplink control information includes the hybrid automatic repeat request acknowledgement information corresponding to the downlink data in each subframe in the first subframe set.

In the uplink control channel sending and receiving method provided in this embodiment of the present invention, after sending the downlink data to the UE in each subframe in the first subframe set, the network device sends trigger information (that is, the first downlink control information) to the UE to trigger the UE to send the target physical uplink control channel in the first uplink subframe. The target physical uplink control channel carries the first uplink control information including the hybrid automatic repeat request acknowledgement information corresponding to the downlink data that is in each subframe in the first subframe set and that is received by the UE. In this way, a problem of how the UE sends a physical uplink control channel on a unlicensed spectrum resource is resolved. Further, a resource for sending a physical uplink control channel by the UE is the first uplink subframe in time domain, and may be a physical uplink control channel resource in a physical uplink control channel resource set preconfigured by the network device in frequency domain and/or orthogonal code resource domain. For a type (unicast and broadcast) of the first downlink control information, physical uplink control channel resource sets preconfigured by the network device are mutually independent, and the UE may select a physical uplink control channel resource from the preconfigured physical uplink control channel resource set based on the type of the first downlink control information. A power adjustment value for sending a physical uplink control channel may be sent to the UE by adding the power adjustment value to the first downlink control information, and/or a power adjustment value for sending a physical uplink control channel is implemented by the network device by using the downlink control information corresponding to the downlink data in the first subframe set to indicate a power adjustment amount for sending a target physical uplink control channel on each carrier. In this way, a problem of how to determine, when the carrier on which the target physical uplink control channel sent by the UE is located can dynamically vary in the carrier configuration set, a resource and a power adjustment value for sending a physical uplink control channel is resolved.

Figure 3:
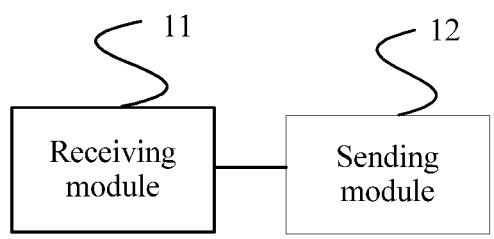
FIG. 3 is a schematic structural diagram of Embodiment 1 of a terminal device according to the present invention.

FIG. 3 is a schematic structural diagram of Embodiment 1 of a terminal device according to the present invention. As shown in FIG. 3, the terminal device in this embodiment may include a receiving module 11 and a sending module 12. The receiving module 11 is configured to receive downlink data sent by a network device in each subframe in a first subframe set. The first subframe set includes N subframes, and each of the N subframes is a downlink full subframe, or M of the N subframes are downlink partial subframes, and N-M of the N subframes are downlink full subframes, where M is less than or equal to N, and both M and N are integers. The receiving module 11 is further configured to obtain first downlink control information sent by the network device. The sending module 12 is configured to send a target physical uplink control channel in a first uplink subframe according to an indication of the first downlink control information. The target physical uplink control channel includes first uplink control information, and the first uplink control information includes hybrid automatic repeat request acknowledgement information corresponding to the downlink data that is in each subframe in the first subframe set and that is received by the receiving module 11.

In a feasible manner, the first downlink control information is first-type downlink control information, and a resource of the target physical uplink control channel is a physical uplink control channel resource in a first physical uplink control channel resource set; or the first downlink control information is second-type downlink control information, and a resource of the target physical uplink control channel is a physical uplink control channel resource in a second physical uplink control channel resource set. The first-type downlink control information is terminal-device-specific physical downlink control information, the second-type downlink control information is terminal-device-group-specific physical downlink control information or common physical downlink control information, and each of the first physical uplink control channel resource set and the second physical uplink control channel resource set is a set of physical uplink control channel resources configured by the network device for the terminal device.

Further, the first physical uplink control channel resource set and the second physical uplink control channel resource set are sets separately configured by the network device for the terminal device; or the first physical uplink control channel resource set is a set configured by the network device for the terminal device, and the second physical uplink control channel resource set is a subset of the first physical uplink control channel resource set.

Optionally, the first physical uplink control channel resource set includes at least two physical uplink control channel resources, and the second physical uplink control channel resource set includes one physical uplink control channel resource.

Optionally, the first downlink control information is the second-type downlink control information, the second physical uplink control channel resource set is an empty set, and the sending module 12 does not send the first uplink control information in the first uplink subframe.

In another feasible manner, the first uplink subframe is a first-type uplink subframe, and a resource of the target physical uplink control channel is a physical uplink control channel resource in a third physical uplink control channel resource set; or the first uplink subframe is a second-type uplink subframe, and a resource of the target physical uplink control channel is a physical uplink control channel resource in a fourth physical uplink control channel resource set. The first-type uplink subframe is an uplink subframe in which a physical uplink control channel sent by the sending module 12 occupies R symbols, the second-type uplink subframe is an uplink subframe in which a physical uplink control channel sent by the sending module 12 occupies fewer than R symbols, and each of the third physical uplink control channel resource set and the fourth physical uplink control channel resource set is a set of physical uplink control channel resources configured by the network device for the terminal device, where R is an integer.

Further, the third physical uplink control channel resource set and the fourth physical uplink control channel resource set are sets separately configured by the network device for the terminal device; or the third physical uplink control channel resource set is a set configured by the network device for the terminal device, and the fourth physical uplink control channel resource set is a subset of the third physical uplink control channel resource set.

Optionally, the first uplink subframe is the second-type uplink subframe, the fourth physical uplink control channel resource set is an empty set, and the sending module 12 does not send the first uplink control information in the first uplink subframe.

In the foregoing embodiment, the first downlink control information includes first indication information; when the first indication information is first information, the first downlink control information is used to instruct the sending module 12 to send the target physical uplink control channel; and when the first indication information is second information, the first downlink control information is used to instruct the sending module 12 to send a target physical uplink shared channel, and the target physical uplink shared channel carries uplink data or carries uplink data and hybrid automatic repeat request acknowledgement information. In this design, the first downlink control information sent by the network device to the UE may be in a same format as control information that is sent by the network device to the UE and that is used to schedule the UE to send an uplink shared channel, so that complexity of blind detection by the UE can be reduced.

Further, the first downlink control information includes second indication information, the second indication information is used to indicate a first power adjustment value for sending the target physical uplink control channel by the sending module 12, and transmit power for sending the target physical uplink control channel by the sending module 12 includes a power adjustment amount indicated by the first power adjustment value.

Further, the transmit power of the target physical uplink control channel includes a power adjustment amount indicated by a second power adjustment value, the second power adjustment value is a power adjustment value determined by the terminal device according to an indication value of a power adjustment field in downlink control information included in a first control information group, and the first control information group includes downlink control information corresponding to downlink data in each subframe in a second subframe set; the second subframe set is equivalent to the first subframe set, or the second subframe set is a set of subframes in the first subframe set that are located on a first carrier, or the second subframe set is a set of subframes that are in the first subframe set and in which downlink data corresponds to downlink control information that is located on the first carrier; and the first carrier is a carrier on which the target physical uplink control channel is located, or the first carrier is a carrier on which the first downlink control information is located.

Optionally, the first carrier is a carrier in a carrier configuration set, the carrier configuration set is a set of carriers configured for the terminal device to communicate with the network device, the carrier configuration set includes H carriers, and the first carrier is a $G^{th}$ carrier in the carrier configuration set, where both G and H are positive integers, H≥2, 1≤G≤H, and a value of G can vary in all subframes.

Further, the second subframe set is a set of all subframes in the first subframe set that are located on the first carrier; or the second subframe set is a set of all subframes that are in the first subframe set and in which downlink data corresponds to downlink control information that is located on the first carrier; or the second subframe set is a set of all subframes in the first subframe set that are located on the first carrier and in which corresponding downlink control information is located on the first carrier.

Further, indication values of power adjustment fields in downlink control information in subframes indicating same time in the first control information group are the same.

The terminal device in this embodiment may be configured to execute the technical solution in the method embodiment shown in FIG. 1. An implementation principle of the terminal device is similar to that in the method embodiment and is not described herein again.

In the terminal device provided in this embodiment of the present invention, after receiving the downlink data sent by the network device in each subframe in the first subframe set, the receiving module obtains trigger information (that is, the first downlink control information) sent by the network device, to trigger the sending module to send the target physical uplink control channel in the first uplink subframe. The target physical uplink control channel carries the first uplink control information including the hybrid automatic repeat request acknowledgement information corresponding to the downlink data that is in each subframe in the first subframe set and that is received by the UE. In this way, a problem of how the UE sends a physical uplink control channel on a unlicensed spectrum resource is resolved. Further, a resource for sending a physical uplink control channel by the UE is the first uplink subframe in time domain, and may be a physical uplink control channel resource in a physical uplink control channel resource set preconfigured by the network device in frequency domain and/or orthogonal code resource domain. For a type (unicast and broadcast) of the first downlink control information, physical uplink control channel resource sets preconfigured by the network device are mutually independent, and the UE may select a physical uplink control channel resource from the preconfigured physical uplink control channel resource set based on the type of the first downlink control information. A power adjustment value for sending a physical uplink control channel may be sent to the UE by adding the power adjustment value to the first downlink control information, and/or a power adjustment value for sending a physical uplink control channel is implemented by the network device by using the downlink control information corresponding to the downlink data in the first subframe set to indicate a power adjustment amount for sending a target physical uplink control channel on each carrier. In this way, a problem of how to determine, when the carrier on which the target physical uplink control channel sent by the UE is located can dynamically vary in the carrier configuration set, a resource and a power adjustment value for sending a physical uplink control channel is resolved.

Figure 4:
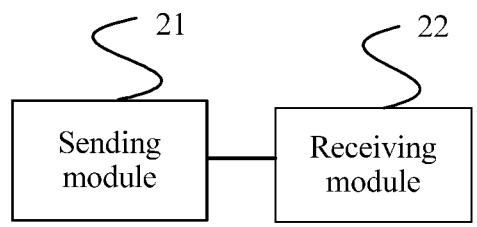
FIG. 4 is a schematic structural diagram of Embodiment 1 of a network device according to the present invention.

FIG. 4 is a schematic structural diagram of Embodiment 1 of a network device according to the present invention. As shown in FIG. 4, the network device in this embodiment may include a sending module 21 and a receiving module 22. The sending module 21 is configured to send downlink data to a terminal device UE in each subframe in a first subframe set. The first subframe set includes N subframes, and each of the N subframes is a downlink full subframe, or M of the N subframes are downlink partial subframes, and N-M of the N subframes are downlink full subframes, where M is less than or equal to N, and both M and N are integers. The sending module 21 is further configured to send first downlink control information to the UE. The receiving module 22 is configured to receive a target physical uplink control channel sent by the UE in a first uplink subframe according to an indication of the first downlink control information. The target physical uplink control channel includes first uplink control information, and the first uplink control information includes hybrid automatic repeat request acknowledgement information corresponding to the downlink data that is in each subframe in the first subframe set and that is received by the UE.

In a feasible manner, the first downlink control information is first-type downlink control information, and a resource of the target physical uplink control channel is a physical uplink control channel resource in a first physical uplink control channel resource set; or the first downlink control information is second-type downlink control information, and a resource of the target physical uplink control channel is a physical uplink control channel resource in a second physical uplink control channel resource set. The first-type downlink control information is UE-specific physical downlink control information, the second-type downlink control information is UE-group-specific physical downlink control information or common physical downlink control information, and each of the first physical uplink control channel resource set and the second physical uplink control channel resource set is a set of physical uplink control channel resources configured by the network device for the UE.

Figure 5:
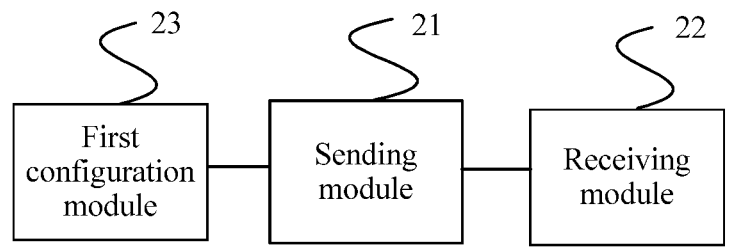
FIG. 5 is a schematic structural diagram of Embodiment 2 of a network device according to the present invention.

FIG. 5 is a schematic structural diagram of Embodiment 2 of a network device according to the present invention. As shown in FIG. 5, based on the apparatus structure shown in FIG. 4, the apparatus in this embodiment may further include a first configuration module 23. The first configuration module 23 is configured to: separately configure the first physical uplink control channel resource set and the second physical uplink control channel resource set for the UE; or configure the first physical uplink control channel resource set for the UE, where the second physical uplink control channel resource set is a subset of the first physical uplink control channel resource set.

The first physical uplink control channel resource set includes at least two physical uplink control channel resources, and the second physical uplink control channel resource set includes one physical uplink control channel resource.

Optionally, the first downlink control information is the second-type downlink control information, the second physical uplink control channel resource set is an empty set, and the receiving module 22 does not receive the first uplink control information in the first uplink subframe.

In another feasible manner, the first uplink subframe is a first-type uplink subframe, and a resource of the target physical uplink control channel is a physical uplink control channel resource in a third physical uplink control channel resource set; or the first uplink subframe is a second-type uplink subframe, and a resource of the target physical uplink control channel is a physical uplink control channel resource in a fourth physical uplink control channel resource set. The first-type uplink subframe is an uplink subframe in which a physical uplink control channel sent by the UE occupies R symbols, the second-type uplink subframe is an uplink subframe in which a physical uplink control channel sent by the UE occupies fewer than R symbols, and each of the third physical uplink control channel resource set and the fourth physical uplink control channel resource set is a set of physical uplink control channel resources configured by the network device for the UE, where R is an integer.

Figure 6:
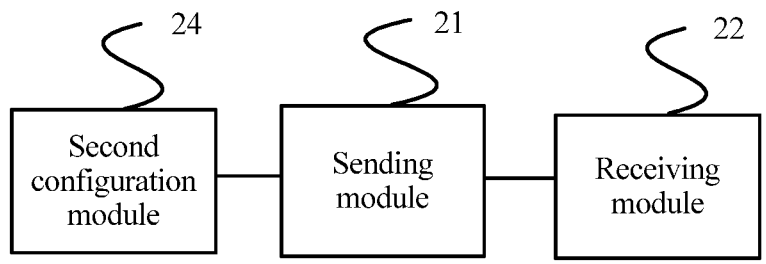
FIG. 6 is a schematic structural diagram of Embodiment 3 of a network device according to the present invention.

FIG. 6 is a schematic structural diagram of Embodiment 3 of a network device according to the present invention. As shown in FIG. 6, based on the apparatus structure shown in FIG. 4, the apparatus in this embodiment may further include a second configuration module 24. The second configuration module 24 is configured to: separately configure the third physical uplink control channel resource set and the fourth physical uplink control channel resource set for the UE; or configure the third physical uplink control channel resource set for the UE, where the fourth physical uplink control channel resource set is a subset of the third physical uplink control channel resource set.

Optionally, the first uplink subframe is the second-type uplink subframe, the fourth physical uplink control channel resource set is an empty set, and the receiving module 22 does not receive the first uplink control information in the first uplink subframe.

In the foregoing embodiment, the first downlink control information includes first indication information; when the first indication information is first information, the first downlink control information is used to instruct the sending module to send the target physical uplink control channel; and when the first indication information is second information, the first downlink control information is used to instruct the sending module to send a target physical uplink shared channel, and the target physical uplink shared channel carries uplink data or carries uplink data and hybrid automatic repeat request acknowledgement information. In this design, the first downlink control information sent by the network device to the UE may be in a same format as control information that is sent by the network device to the UE and that is used to schedule the UE to send an uplink shared channel, so that complexity of blind detection by the UE can be reduced.

Further, the first downlink control information includes second indication information, the second indication information is used to indicate a first power adjustment value for sending the target physical uplink control channel by the sending module, and transmit power for sending the target physical uplink control channel by the sending module includes a power adjustment amount indicated by the first power adjustment value.

Further, the transmit power of the target physical uplink control channel includes a power adjustment amount indicated by a second power adjustment value, the second power adjustment value is a power adjustment value determined by the terminal device according to an indication value of a power adjustment field in downlink control information included in a first control information group, and the first control information group includes downlink control information corresponding to downlink data in each subframe in a second subframe set; the second subframe set is equivalent to the first subframe set, or the second subframe set is a set of subframes in the first subframe set that are located on a first carrier, or the second subframe set is a set of subframes that are in the first subframe set and in which downlink data corresponds to downlink control information that is located on the first carrier; and the first carrier is a carrier on which the target physical uplink control channel is located, or the first carrier is a carrier on which the first downlink control information is located.

Optionally, the first carrier is a carrier in a carrier configuration set, the carrier configuration set is a set of carriers configured for the terminal device to communicate with the network device, the carrier configuration set includes H carriers, and the first carrier is a $G^{th}$ carrier in the carrier configuration set, where both G and H are positive integers, $H \geq 2$, $1 \leq G \leq H$, and a value of G can vary in all subframes.

Further, the second subframe set is a set of all subframes in the first subframe set that are located on the first carrier; or the second subframe set is a set of all subframes that are in the first subframe set and in which downlink data corresponds to downlink control information that is located on the first carrier; or the second subframe set is a set of all subframes in the first subframe set that are located on the first carrier and in which corresponding downlink control information is located on the first carrier.

Further, indication values of power adjustment fields in downlink control information in subframes indicating same time in the first control information group are the same.

The terminal device shown in FIG. 4 to FIG. 6 may be configured to execute the technical solution in the method embodiment shown in FIG. 1. An implementation principle of the terminal device is similar to that in the method embodiment and is not described herein again.

In the terminal device provided in the foregoing embodiment, after sending the downlink data to the UE in each subframe in the first subframe set, the sending module sends trigger information (that is, the first downlink control information) to the UE to trigger the UE to send the target physical uplink control channel in the first uplink subframe. The target physical uplink control channel carries the first uplink control information including the hybrid automatic repeat request acknowledgement information corresponding to the downlink data that is in each subframe in the first subframe set and that is received by the UE. The receiving module receives the target physical uplink control channel sent by the UE in the first uplink subframe. In this way, a problem of how the UE sends a physical uplink control channel on a unlicensed spectrum resource is resolved. Further, a resource for sending a physical uplink control channel by the UE is the first uplink subframe in time domain, and may be a physical uplink control channel resource in a physical uplink control channel resource set preconfigured by the network device in frequency domain and/or orthogonal code resource domain. For a type (unicast and broadcast) of the first downlink control information, physical uplink control channel resource sets preconfigured by the network device are mutually independent, and the UE may select a physical uplink control channel resource from the preconfigured physical uplink control channel resource set based on the type of the first downlink control information. A power adjustment value for sending a physical uplink control channel may be sent to the UE by adding the power adjustment value to the first downlink control information, and/or a power adjustment value for sending a physical uplink control channel is implemented by the network device by using the downlink control information corresponding to the downlink data in the first subframe set to indicate a power adjustment amount for sending a target physical uplink control channel on each carrier. In this way, a problem of how to determine, when the carrier on which the target physical uplink control channel sent by the UE is located can dynamically vary in the carrier configuration set, a resource and a power adjustment value for sending a physical uplink control channel is resolved.

Figure 7:
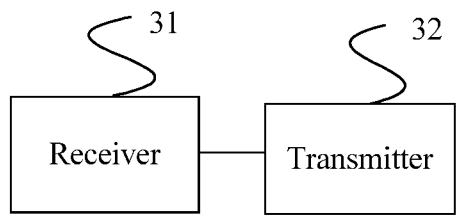
FIG. 7 is a schematic structural diagram of Embodiment 2 of a terminal device according to the present invention.

FIG. 7 is a schematic structural diagram of Embodiment 2 of a terminal device according to the present invention. As shown in FIG. 7, the terminal device in this embodiment may include a receiver 31 and a transmitter 32. The receiver 31 is configured to receive downlink data sent by a network device in each subframe in a first subframe set. The first subframe set includes N subframes, and each of the N subframes is a downlink full subframe, or M of the N subframes are downlink partial subframes, and N-M of the N subframes are downlink full subframes, where M is less than or equal to N, and both M and N are integers. The receiver 31 is further configured to obtain first downlink control information sent by the network device. The transmitter 32 is configured to send a target physical uplink control channel in a first uplink subframe according to an indication of the first downlink control information. The target physical uplink control channel includes first uplink control information, and the first uplink control information includes hybrid automatic repeat request acknowledgement information corresponding to the downlink data that is in each subframe in the first subframe set and that is received by the receiver 31.

In a feasible manner, the first downlink control information is first-type downlink control information, and a resource of the target physical uplink control channel is a physical uplink control channel resource in a first physical uplink control channel resource set; or the first downlink control information is second-type downlink control information, and a resource of the target physical uplink control channel is a physical uplink control channel resource in a second physical uplink control channel resource set. The first-type downlink control information is terminal-device-specific physical downlink control information, the second-type downlink control information is terminal-device-group-specific physical downlink control information or common physical downlink control information, and each of the first physical uplink control channel resource set and the second physical uplink control channel resource set is a set of physical uplink control channel resources configured by the network device for the terminal device.

Further, the first physical uplink control channel resource set and the second physical uplink control channel resource set are sets separately configured by the network device for the terminal device; or the first physical uplink control channel resource set is a set configured by the network device for the terminal device, and the second physical uplink control channel resource set is a subset of the first physical uplink control channel resource set.

Optionally, the first physical uplink control channel resource set includes at least two physical uplink control channel resources, and the second physical uplink control channel resource set includes one physical uplink control channel resource.

Optionally, the first downlink control information is the second-type downlink control information, the second physical uplink control channel resource set is an empty set, and the transmitter 32 does not send the first uplink control information in the first uplink subframe.

In another feasible manner, the first uplink subframe is a first-type uplink subframe, and a resource of the target physical uplink control channel is a physical uplink control channel resource in a third physical uplink control channel resource set; or the first uplink subframe is a second-type uplink subframe, and a resource of the target physical uplink control channel is a physical uplink control channel resource in a fourth physical uplink control channel resource set. The first-type uplink subframe is an uplink subframe in which a physical uplink control channel sent by the transmitter 32 occupies R symbols, the second-type uplink subframe is an uplink subframe in which a physical uplink control channel sent by the transmitter 32 occupies fewer than R symbols, and each of the third physical uplink control channel resource set and the fourth physical uplink control channel resource set is a set of physical uplink control channel resources configured by the network device for the terminal device, where R is an integer.

Further, the third physical uplink control channel resource set and the fourth physical uplink control channel resource set are sets separately configured by the network device for the terminal device; or the third physical uplink control channel resource set is a set configured by the network device for the terminal device, and the fourth physical uplink control channel resource set is a subset of the third physical uplink control channel resource set.

Optionally, the first uplink subframe is the second-type uplink subframe, the fourth physical uplink control channel resource set is an empty set, and the transmitter 32 does not send the first uplink control information in the first uplink subframe.

In the foregoing embodiment, the first downlink control information includes first indication information; when the first indication information is first information, the first downlink control information is used to instruct the transmitter 32 to send the target physical uplink control channel; and when the first indication information is second information, the first downlink control information is used to instruct the transmitter 32 to send a target physical uplink shared channel, and the target physical uplink shared channel carries uplink data or carries uplink data and hybrid automatic repeat request acknowledgement information. In this design, the first downlink control information sent by the network device to the UE may be in a same format as control information that is sent by the network device to the UE and that is used to schedule the UE to send an uplink shared channel, so that complexity of blind detection by the UE can be reduced.

Further, the first downlink control information includes second indication information, the second indication information is used to indicate a first power adjustment value for sending the target physical uplink control channel by the transmitter 32, and transmit power for sending the target physical uplink control channel by the transmitter 32 includes a power adjustment amount indicated by the first power adjustment value.

Further, the transmit power of the target physical uplink control channel includes a power adjustment amount indicated by a second power adjustment value, the second power adjustment value is a power adjustment value determined by the terminal device according to an indication value of a power adjustment field in downlink control information included in a first control information group, and the first control information group includes downlink control information corresponding to downlink data in each subframe in a second subframe set; the second subframe set is equivalent to the first subframe set, or the second subframe set is a set of subframes in the first subframe set that are located on a first carrier, or the second subframe set is a set of subframes that are in the first subframe set and in which downlink data corresponds to downlink control information that is located on the first carrier; and the first carrier is a carrier on which the target physical uplink control channel is located, or the first carrier is a carrier on which the first downlink control information is located.

Optionally, the first carrier is a carrier in a carrier configuration set, the carrier configuration set is a set of carriers configured for the terminal device to communicate with the network device, the carrier configuration set includes H carriers, and the first carrier is a $G^{th}$ carrier in the carrier configuration set, where both G and H are positive integers, H≥2, 1≤G≤H, and a value of G can vary in all subframes.

Further, the second subframe set is a set of all subframes in the first subframe set that are located on the first carrier; or the second subframe set is a set of all subframes that are in the first subframe set and in which downlink data corresponds to downlink control information that is located on the first carrier; or the second subframe set is a set of all subframes in the first subframe set that are located on the first carrier and in which corresponding downlink control information is located on the first carrier.

Further, indication values of power adjustment fields in downlink control information in subframes indicating same time in the first control information group are the same.

The terminal device in this embodiment may be configured to execute the technical solution in the method embodiment shown in FIG. 1. An implementation principle of the terminal device is similar to that in the method embodiment and is not described herein again.

In the terminal device provided in this embodiment of the present invention, after receiving the downlink data sent by the network device in each subframe in the first subframe set, the receiver obtains trigger information (that is, the first downlink control information) sent by the network device, to trigger the transmitter to send the target physical uplink control channel in the first uplink subframe. The target physical uplink control channel carries the first uplink control information including the hybrid automatic repeat request acknowledgement information corresponding to the downlink data that is in each subframe in the first subframe set and that is received by the UE. In this way, a problem of how the UE sends a physical uplink control channel on a unlicensed spectrum resource is resolved. Further, a resource for sending a physical uplink control channel by the UE is the first uplink subframe in time domain, and may be a physical uplink control channel resource in a physical uplink control channel resource set preconfigured by the network device in frequency domain and/or orthogonal code resource domain. For a type (unicast and broadcast) of the first downlink control information, physical uplink control channel resource sets preconfigured by the network device are mutually independent, and the UE may select a physical uplink control channel resource from the preconfigured physical uplink control channel resource set based on the type of the first downlink control information. A power adjustment value for sending a physical uplink control channel may be sent to the UE by adding the power adjustment value to the first downlink control information, and/or a power adjustment value for sending a physical uplink control channel is implemented by the network device by using the downlink control information corresponding to the downlink data in the first subframe set to indicate a power adjustment amount for sending a target physical uplink control channel on each carrier. In this way, a problem of how to determine, when the carrier on which the target physical uplink control channel sent by the UE is located can dynamically vary in the carrier configuration set, a resource and a power adjustment value for sending a physical uplink control channel is resolved.

Figure 8:
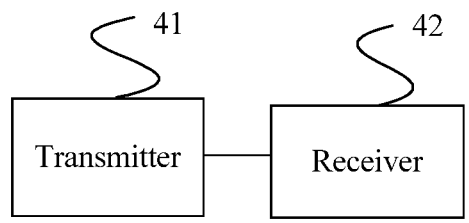
FIG. 8 is a schematic structural diagram of Embodiment 4 of a network device according to the present invention.

FIG. 8 is a schematic structural diagram of Embodiment 4 of a network device according to the present invention. As shown in FIG. 8, the network device in this embodiment may include a transmitter 41 and a receiver 42. The transmitter 41 is configured to send downlink data to a terminal device UE in each subframe in a first subframe set. The first subframe set includes N subframes, and each of the N subframes is a downlink full subframe, or M of the N subframes are downlink partial subframes, and N-M of the N subframes are downlink full subframes, where M is less than or equal to N, and both M and N are integers. The transmitter 41 is further configured to send first downlink control information to the UE. The receiver 42 is configured to receive a target physical uplink control channel sent by the UE in a first uplink subframe according to an indication of the first downlink control information. The target physical uplink control channel includes first uplink control information, and the first uplink control information includes hybrid automatic repeat request acknowledgement information corresponding to the downlink data that is in each subframe in the first subframe set and that is received by the UE.

In a feasible manner, the first downlink control information is first-type downlink control information, and a resource of the target physical uplink control channel is a physical uplink control channel resource in a first physical uplink control channel resource set; or the first downlink control information is second-type downlink control information, and a resource of the target physical uplink control channel is a physical uplink control channel resource in a second physical uplink control channel resource set. The first-type downlink control information is UE-specific physical downlink control information, the second-type downlink control information is UE-group-specific physical downlink control information or common physical downlink control information, and each of the first physical uplink control channel resource set and the second physical uplink control channel resource set is a set of physical uplink control channel resources configured by the network device for the UE.

Figure 9:
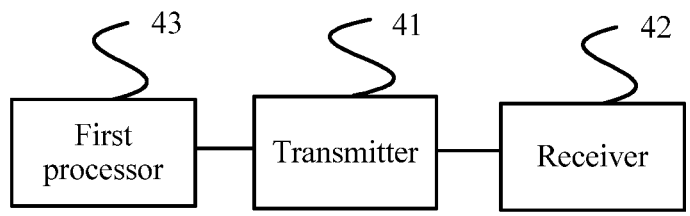
FIG. 9 is a schematic structural diagram of Embodiment 5 of a network device according to the present invention.

FIG. 9 is a schematic structural diagram of Embodiment 5 of a network device according to the present invention. As shown in FIG. 9, based on the apparatus structure shown in FIG. 8, the apparatus in this embodiment may further include a first processor 43. The first processor 43 is configured to: separately configure the first physical uplink control channel resource set and the second physical uplink control channel resource set for the UE; or configure the first physical uplink control channel resource set for the UE, where the second physical uplink control channel resource set is a subset of the first physical uplink control channel resource set.

The first physical uplink control channel resource set includes at least two physical uplink control channel resources, and the second physical uplink control channel resource set includes one physical uplink control channel resource.

Optionally, the first downlink control information is the second-type downlink control information, the second physical uplink control channel resource set is an empty set, and the receiver 42 does not receive the first uplink control information in the first uplink subframe.

In another feasible manner, the first uplink subframe is a first-type uplink subframe, and a resource of the target physical uplink control channel is a physical uplink control channel resource in a third physical uplink control channel resource set; or the first uplink subframe is a second-type uplink subframe, and a resource of the target physical uplink control channel is a physical uplink control channel resource in a fourth physical uplink control channel resource set. The first-type uplink subframe is an uplink subframe in which a physical uplink control channel sent by the UE occupies R symbols, the second-type uplink subframe is an uplink subframe in which a physical uplink control channel sent by the UE occupies fewer than R symbols, and each of the third physical uplink control channel resource set and the fourth physical uplink control channel resource set is a set of physical uplink control channel resources configured by the network device for the UE, where R is an integer.

Figure 10:
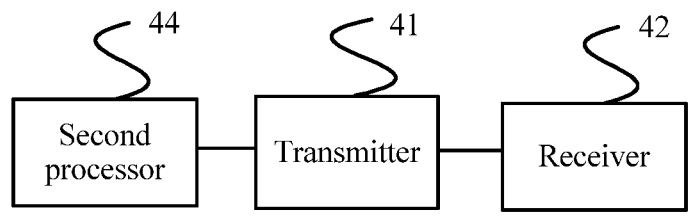
FIG. 10 is a schematic structural diagram of Embodiment 6 of a network device according to the present invention.

FIG. 10 is a schematic structural diagram of Embodiment 6 of a network device according to the present invention. As shown in FIG. 10, based on the apparatus structure shown in FIG. 8, the apparatus in this embodiment may further include a second processor 44. The second processor 44 is configured to: separately configure the third physical uplink control channel resource set and the fourth physical uplink control channel resource set for the UE; or configure the third physical uplink control channel resource set for the UE, where the fourth physical uplink control channel resource set is a subset of the third physical uplink control channel resource set.

Optionally, the first uplink subframe is the second-type uplink subframe, the fourth physical uplink control channel resource set is an empty set, and the receiver 42 does not receive the first uplink control information in the first uplink subframe.

In the foregoing embodiment, the first downlink control information includes first indication information; when the first indication information is first information, the first downlink control information is used to instruct the transmitter 41 to send the target physical uplink control channel; and when the first indication information is second information, the first downlink control information is used to instruct the transmitter 41 to send a target physical uplink shared channel, and the target physical uplink shared channel carries uplink data or carries uplink data and hybrid automatic repeat request acknowledgement information. In this design, the first downlink control information sent by the network device to the UE may be in a same format as control information that is sent by the network device to the UE and that is used to schedule the UE to send an uplink shared channel, so that complexity of blind detection by the UE can be reduced.

Further, the first downlink control information includes second indication information, the second indication information is used to indicate a first power adjustment value for sending the target physical uplink control channel by the transmitter 41, and transmit power for sending the target physical uplink control channel by the transmitter 41 includes a power adjustment amount indicated by the first power adjustment value.

Further, the transmit power of the target physical uplink control channel includes a power adjustment amount indicated by a second power adjustment value, the second power adjustment value is a power adjustment value determined by the terminal device according to an indication value of a power adjustment field in downlink control information included in a first control information group, and the first control information group includes downlink control information corresponding to downlink data in each subframe in a second subframe set; the second subframe set is equivalent to the first subframe set, or the second subframe set is a set of subframes in the first subframe set that are located on a first carrier, or the second subframe set is a set of subframes that are in the first subframe set and in which downlink data corresponds to downlink control information that is located on the first carrier; and the first carrier is a carrier on which the target physical uplink control channel is located, or the first carrier is a carrier on which the first downlink control information is located.

Optionally, the first carrier is a carrier in a carrier configuration set, the carrier configuration set is a set of carriers configured for the terminal device to communicate with the network device, the carrier configuration set includes H carriers, and the first carrier is a $G^{th}$ carrier in the carrier configuration set, where both G and H are positive integers, $H \geq 2$, $1 \leq G \leq H$, and a value of G can vary in all subframes.

Further, the second subframe set is a set of all subframes in the first subframe set that are located on the first carrier; or the second subframe set is a set of all subframes that are in the first subframe set and in which downlink data corresponds to downlink control information that is located on the first carrier; or the second subframe set is a set of all subframes in the first subframe set that are located on the first carrier and in which corresponding downlink control information is located on the first carrier.

Further, indication values of power adjustment fields in downlink control information in subframes indicating same time in the first control information group are the same.

The terminal device shown in FIG. 8 to FIG. 10 may be configured to execute the technical solution in the method embodiment shown in FIG. 1. An implementation principle of the terminal device is similar to that in the method embodiment and is not described herein again.

In the terminal device provided in the foregoing embodiment, after sending the downlink data to the UE in each subframe in the first subframe set, the transmitter sends trigger information (that is, the first downlink control information) to the UE to trigger the UE to send the target physical uplink control channel in the first uplink subframe. The target physical uplink control channel carries the first uplink control information including the hybrid automatic repeat request acknowledgement information corresponding to the downlink data that is in each subframe in the first subframe set and that is received by the UE. The receiver receives the target physical uplink control channel sent by the UE in the first uplink subframe. In this way, a problem of how the UE sends a physical uplink control channel on a unlicensed spectrum resource is resolved. Further, a resource for sending a physical uplink control channel by the UE is the first uplink subframe in time domain, and may be a physical uplink control channel resource in a physical uplink control channel resource set preconfigured by the network device in frequency domain and/or orthogonal code resource domain. For a type (unicast and broadcast) of the first downlink control information, physical uplink control channel resource sets preconfigured by the network device are mutually independent, and the UE may select a physical uplink control channel resource from the preconfigured physical uplink control channel resource set based on the type of the first downlink control information. A power adjustment value for sending a physical uplink control channel may be sent to the UE by adding the power adjustment value to the first downlink control information, and/or a power adjustment value for sending a physical uplink control channel is implemented by the network device by using the downlink control information corresponding to the downlink data in the first subframe set to indicate a power adjustment amount for sending a target physical uplink control channel on each carrier. In this way, a problem of how to determine, when the carrier on which the target physical uplink control channel sent by the UE is located can dynamically vary in the carrier configuration set, a resource and a power adjustment value for sending a physical uplink control channel is resolved.

Figure 11:
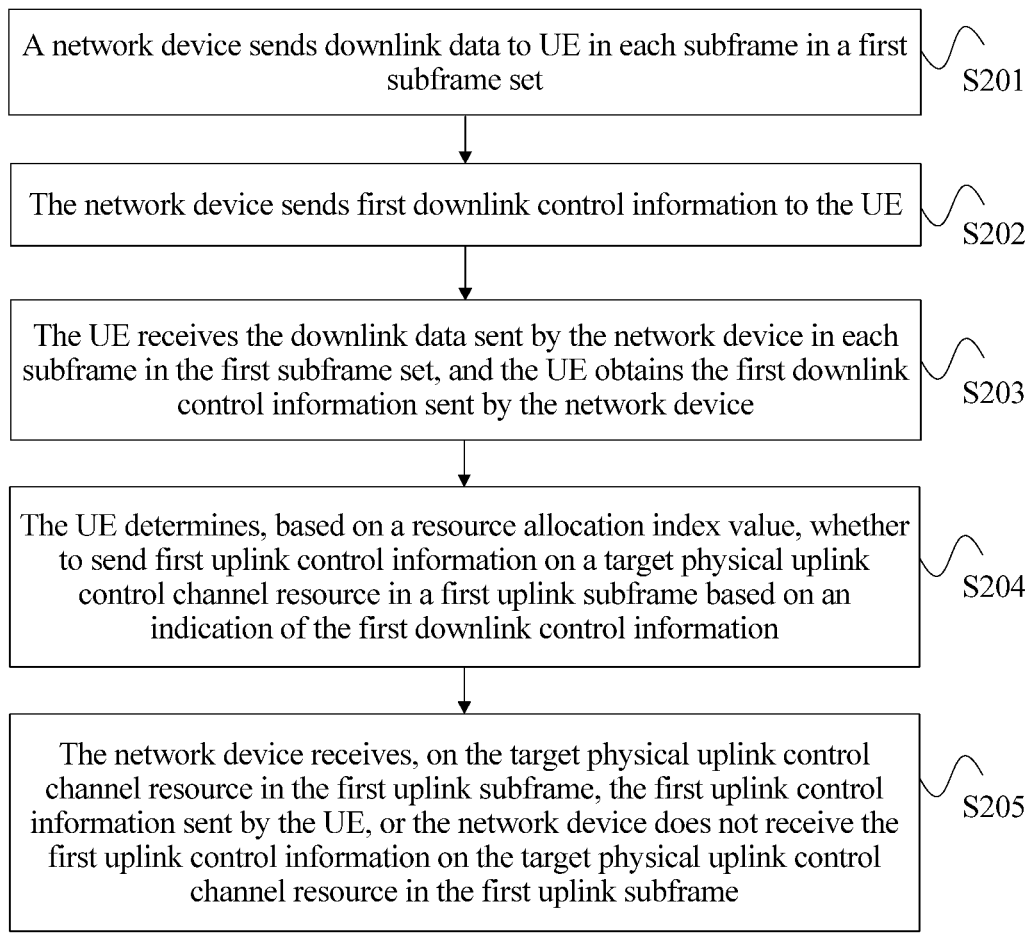
FIG. 11 is a schematic flowchart of Embodiment 2 of an uplink control channel sending and receiving method according to the present invention.

FIG. 11 is a schematic flowchart of Embodiment 2 of an uplink control channel sending and receiving method according to the present invention. As shown in FIG. 11, the method in this embodiment includes the following steps.

S201. A network device sends downlink data to UE in each subframe in a first subframe set, where the first subframe set includes N subframes, and each of the N subframes is a downlink full subframe, or M of the N subframes are downlink partial subframes, and N-M of the N subframes are downlink full subframes, where M is less than or equal to N, and both M and N are integers.

Specifically, an implementation in S201 is the same as that described in S101 and is not described herein again.

S202. The network device sends first downlink control information to the UE.

Specifically, an implementation in S202 is the same as that described in S102 and is not described herein again.

S203. The UE receives the downlink data sent by the network device in each subframe in the first subframe set, and the UE obtains the first downlink control information sent by the network device.

As described in S201 and S202, the UE may receive the downlink data sent by the network device to the UE in each subframe in the first subframe set, and obtain the first downlink control information sent by the network device.

S204. The UE determines, based on a resource allocation index value, whether to send first uplink control information on a target physical uplink control channel resource in a first uplink subframe according to an indication of the first downlink control information.

After obtaining the first downlink control information, the UE determines, based on the resource allocation index value, whether to send the first uplink control information on the target physical uplink control channel resource in the first uplink subframe according to the indication of the first downlink control information. Herein, the resource allocation index value is indication information in downlink control information corresponding to downlink data in some or all subframes in the first subframe set. The first uplink control information includes hybrid automatic repeat request acknowledgement information corresponding to the downlink data that is in each subframe in the first subframe set and that is received by the UE.

Specifically, the resource allocation index value is used by the UE to determine the target physical uplink control channel resource. The resource allocation index value is a first-type index value or a second-type index value. The first-type index value is corresponding to an index value of the target physical uplink control channel resource in a reference physical uplink control channel resource set. The second-type index value indicates that there is no target physical uplink control channel resource. The reference physical uplink control channel resource set is a set of physical uplink control channel resources configured by the network device for the UE.

After obtaining the first downlink control information, the UE determines, based on the resource allocation index value, to send the first uplink control information on the target physical uplink control channel resource in the first uplink subframe according to the indication of the first downlink control information, or determines not to send the first uplink control information in the first uplink subframe. In an implementation, if the resource allocation index value is the first-type index value, the UE sends the first uplink control information on the target physical uplink control channel resource that is in the first uplink subframe and that is corresponding to the resource allocation index value; or if the resource allocation index value is the second-type index value, the UE does not send the first uplink control information in the first uplink subframe.

It should be noted that the second-type index value indicates that there is no target physical uplink control channel resource. In a possible implementation, the network device configures the reference physical uplink control channel resource set for the UE, and the reference physical uplink control channel resource set includes Np physical uplink control channel resources. The first-type index value indicates which one of the Np physical uplink control channel resources is the target physical uplink control channel resource, that is, the index value of the target physical uplink control channel resource in the reference physical uplink control channel resource set. The second-type index value is corresponding to a resource allocation index value indicating that there is no target physical uplink control channel resource. In an example of Np=3, the resource allocation index value may be indicated by two-bit indication information, as shown in the following table:

| Resource allocation index value | Target physical uplink control channel resource |
|---|---|
| 00 | None |
| 01 | Physical uplink control channel resource with an index 1 in the reference physical uplink control channel resource set |
| 10 | Physical uplink control channel resource with an index 2 in the reference physical uplink control channel resource set |
| 11 | Physical uplink control channel resource with an index 3 in the reference physical uplink control channel resource set |

It should be noted that the second-type index value indicates that there is no target physical uplink control channel resource. In another possible implementation, the network device configures Np physical uplink control channel resources for the UE, but the resource allocation index value that is the second-type index value indicates that the index number of the target physical uplink control channel resource is not an index number corresponding to any one of the Np physical uplink control channel resources. If the UE determines that a current resource allocation index value is the second-type index value, the UE determines that there is no target physical uplink control channel resource. If Np=3, index numbers of three physical uplink control channel resources configured by the network device for the UE are 01, 10, and 11. If the UE determines that the current resource allocation index value is none of 01, 10, and 11, the UE determines that there is no target physical uplink control channel resource. If Np=2, index numbers of two physical uplink control channel resources configured by the network device for the UE are 10 and 11. If the UE determines that the current resource allocation index value is neither 10 nor 11, the UE determines that there is no target physical uplink control channel resource.

That is, the UE may determine, based on the resource allocation index value, that there is no target physical uplink control channel resource, or the target physical uplink control channel resource is a physical uplink control channel resource in the reference physical uplink control channel resource set. If the UE determines, based on the resource allocation index value, that there is no target physical uplink control channel resource, the UE does not send the first uplink control information in the first uplink subframe corresponding to the first downlink control information even if the UE receives the first downlink control information.

If the UE determines, based on the resource allocation index value, that the target physical uplink control channel resource is a physical uplink control channel resource in the reference physical uplink control channel resource set, the UE sends the first uplink control information on the target physical uplink control channel resource in the first uplink subframe. Preferably, the first downlink control information herein is UE-group-specific physical downlink control information or common physical downlink control information.

Optionally, the resource allocation index value is indication information in downlink control information corresponding to downlink data in some or all subframes in the first subframe set. The downlink control information that is sent by the network device to the UE and that is used to schedule the downlink data includes a resource allocation index field. Specifically, the resource allocation index value is determined by the UE by using downlink control information in a third control information group. The third control information group includes downlink control information corresponding to downlink data in each subframe in a third subframe set. Herein, the third subframe set is equivalent to the first subframe set, or the third subframe set is a set of subframes in the first subframe set that are located on a first carrier, or the third subframe set is a set of subframes that are in the first subframe set and in which downlink data corresponds to downlink control information that is located on the first carrier. The first carrier is a carrier on which the target physical uplink control channel is located, or the first carrier is a carrier for sending the first downlink control information by the network device.

Optionally, the first carrier is a carrier in a carrier configuration set. Herein, the carrier configuration set is a set of carriers configured for the UE to communicate with the network device, and the carrier configuration set includes H carriers. The first carrier is a $G^{th}$ carrier in the carrier configuration set, where both G and H are positive integers, H≥2, 1≤G≤H, and a value of G can vary in all subframes.

Optionally, the resource allocation index value is determined by the UE by using downlink control information in a third control information group. Optionally, indication values of resource allocation index fields in downlink control information in subframes indicating same time in the third control information group are the same. For example, the third control information group includes downlink control information in a $T1^{th}$ subframe on a carrier A, a $T2^{th}$ subframe on the carrier A, a $T4^{th}$ subframe on the carrier A, a $T1^{th}$ subframe on a carrier B, and a $T4^{th}$ subframe on the carrier B. Because the $T1^{th}$ subframe on the carrier A and the $T1^{th}$ subframe on the carrier B indicate same time, indication values of resource allocation index fields in downlink control information in the $T1^{th}$ subframe on the carrier A and the $T1^{th}$ subframe on the carrier B are the same. Likewise, indication values of resource allocation index fields in downlink control information in the $T4^{th}$ subframe on the carrier A and the $T4^{th}$ subframe on the carrier B are the same.

The UE may determine the resource allocation index value based on all or some downlink control information in the third control information group. Optionally, the resource allocation index value is determined by using an indication value of a resource allocation index field in downlink control information in a last subframe location in the third control information group. For example, the third control information group includes downlink control information in a $T1^{th}$ subframe on a carrier A, a $T2^{th}$ subframe on the carrier A, a $T4^{th}$ subframe on the carrier A, a $T1^{th}$ subframe on a carrier B, and a $T4^{th}$ subframe on the carrier B. If T1<T2<T3<T4, the resource allocation index value is determined by using an indication value of a resource allocation index field in downlink control information in the T4 subframe on the carrier A (in other words, the resource allocation index value is determined by using an indication value of a resource allocation index field in downlink control information in the T4 subframe on the carrier B because the two are equivalent).

Further, if the UE sends the first uplink control information on the target physical uplink control channel resource in the first uplink subframe, for corresponding transmit power of the UE, refer to the method for determining the transmit power for sending the target physical uplink control channel by the UE in S104. Details are not described herein again.

S205. The network device receives, on the target physical uplink control channel resource in the first uplink subframe, the first uplink control information sent by the UE, or the network device does not receive the first uplink control information on the target physical uplink control channel resource in the first uplink subframe.

In the uplink control channel sending and receiving method provided in this embodiment of the present invention, after sending the downlink data to the UE in each subframe in the first subframe set, the network device sends trigger information (that is, the first downlink control information) to the UE to trigger the UE to send the target physical uplink control channel in the first uplink subframe. The target physical uplink control channel carries the first uplink control information including the hybrid automatic repeat request acknowledgement information corresponding to the downlink data that is in each subframe in the first subframe set and that is received by the UE. In the method in this embodiment of the present invention, when the network device uses UE-group-specific downlink control information or common downlink control information to instruct a plurality of UEs to send target physical uplink control channels in a same uplink subframe, if a quantity of UEs sending target physical uplink control channels on a same time-frequency resource exceeds a quantity of supported UEs that can multiplex the time-frequency resource, the network device may set resource allocation index values of some UEs to a second index value indicating that there is no target physical uplink control channel. In this way, a problem of mutual interference caused by sending the target physical uplink control channels by the plurality of UEs is resolved.

Figure 12:
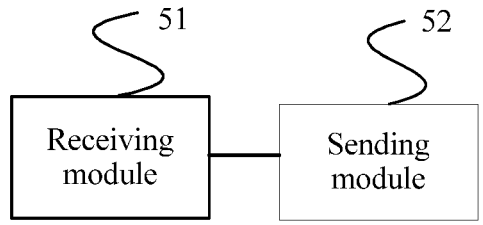
FIG. 12 is a schematic structural diagram of Embodiment 3 of a terminal device according to the present invention.

FIG. 12 is a schematic structural diagram of Embodiment 3 of a terminal device according to the present invention. As shown in FIG. 12, the terminal device in this embodiment includes a receiving module 51 and a sending module 52. The receiving module 51 is configured to receive downlink data sent by a network device in each subframe in a first subframe set. The first subframe set includes N subframes, and each of the N subframes is a downlink full subframe, or M of the N subframes are downlink partial subframes, and N-M of the N subframes are downlink full subframes, where M is less than or equal to N, and both M and N are integers. The receiving module 51 is further configured to obtain first downlink control information sent by the network device.

The sending module 52 is configured to determine, based on a resource allocation index value, whether to send first uplink control information on a target physical uplink control channel resource in a first uplink subframe according to an indication of the first downlink control information. The resource allocation index value is used by the UE to determine the target physical uplink control channel resource, and the first uplink control information includes hybrid automatic repeat request acknowledgement information corresponding to the downlink data that is in each subframe in the first subframe set and that is received by the UE.

The resource allocation index value is indication information in downlink control information corresponding to downlink data in some or all subframes in the first subframe set.

Optionally, the resource allocation index value is a first-type index value or a second-type index value, the first-type index value is corresponding to an index value of the target physical uplink control channel resource in a reference physical uplink control channel resource set, the second-type index value indicates that there is no target physical uplink control channel resource, and the reference physical uplink control channel resource set is a set of physical uplink control channel resources configured by the network device for the UE. The sending module 52 is specifically configured to: if the resource allocation index value is the first-type index value, send the first uplink control information on the target physical uplink control channel resource that is in the first uplink subframe and that is corresponding to the resource allocation index value; or if the resource allocation index value is the second-type index value, skip sending the first uplink control information in the first uplink subframe.

The terminal device in this embodiment may be configured to execute the technical solution in the method embodiment shown in FIG. 11. An implementation principle and a technical effect of the terminal device are similar to those in the method embodiment and are not described herein again.

Figure 13:
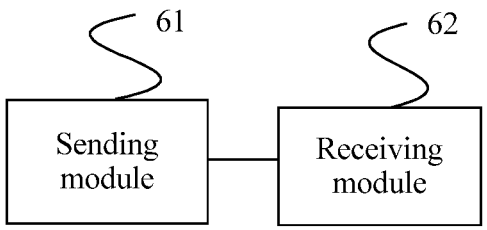
FIG. 13 is a schematic structural diagram of Embodiment 7 of a network device according to the present invention.

FIG. 13 is a schematic structural diagram of Embodiment 7 of a network device according to the present invention. As shown in FIG. 13, the network device in this embodiment may include a sending module 61 and a receiving module 62. The sending module 61 is configured to send downlink data to a terminal device UE in each subframe in a first subframe set. The first subframe set includes N subframes, and each of the N subframes is a downlink full subframe, or M of the N subframes are downlink partial subframes, and N-M of the N subframes are downlink full subframes, where M is less than or equal to N, and both M and N are integers. The sending module 61 is further configured to send first downlink control information to the UE. The receiving module 62 is configured to: receive, on a target physical uplink control channel resource in a first uplink subframe, first uplink control information sent by the UE, or skip receiving the first uplink control information on the target physical uplink control channel resource in the first uplink subframe.

The resource allocation index value is indication information in downlink control information corresponding to downlink data in some or all subframes in the first subframe set.

Optionally, the resource allocation index value is a first-type index value or a second-type index value, the first-type index value is corresponding to an index value of the target physical uplink control channel resource in a reference physical uplink control channel resource set, the second-type index value indicates that there is no target physical uplink control channel resource, and the reference physical uplink control channel resource set is a set of physical uplink control channel resources configured by the network device for the UE.

The network device in this embodiment may be configured to execute the technical solution in the method embodiment shown in FIG. 11. An implementation principle and a technical effect of the network device are similar to those in the method embodiment and are not described herein again.

Figure 14:
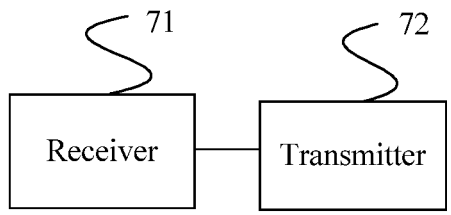
FIG. 14 is a schematic structural diagram of Embodiment 4 of a terminal device according to the present invention.

FIG. 14 is a schematic structural diagram of Embodiment 4 of a terminal device according to the present invention. As shown in FIG. 14, the terminal device in this embodiment includes a receiver 71 and a transmitter 72. The receiver 71 is configured to receive downlink data sent by a network device in each subframe in a first subframe set. The first subframe set includes N subframes, and each of the N subframes is a downlink full subframe, or M of the N subframes are downlink partial subframes, and N-M of the N subframes are downlink full subframes, where M is less than or equal to N, and both M and N are integers. The receiver 71 is further configured to obtain first downlink control information sent by the network device. The transmitter 72 is configured to determine, based on a resource allocation index value, whether to send first uplink control information on a target physical uplink control channel resource in a first uplink subframe according to an indication of the first downlink control information. The resource allocation index value is used by the UE to determine the target physical uplink control channel resource, and the first uplink control information includes hybrid automatic repeat request acknowledgement information corresponding to the downlink data that is in each subframe in the first subframe set and that is received by the UE.

The resource allocation index value is indication information in downlink control information corresponding to downlink data in some or all subframes in the first subframe set.

Optionally, the resource allocation index value is a first-type index value or a second-type index value, the first-type index value is corresponding to an index value of the target physical uplink control channel resource in a reference physical uplink control channel resource set, the second-type index value indicates that there is no target physical uplink control channel resource, and the reference physical uplink control channel resource set is a set of physical uplink control channel resources configured by the network device for the UE. The transmitter 72 is specifically configured to: if the resource allocation index value is the first-type index value, send the first uplink control information on the target physical uplink control channel resource that is in the first uplink subframe and that is corresponding to the resource allocation index value; or if the resource allocation index value is the second-type index value, skip sending the first uplink control information in the first uplink subframe.

The terminal device in this embodiment may be configured to execute the technical solution in the method embodiment shown in FIG. 11. An implementation principle and a technical effect of the terminal device are similar to those in the method embodiment and are not described herein again.

Figure 15:
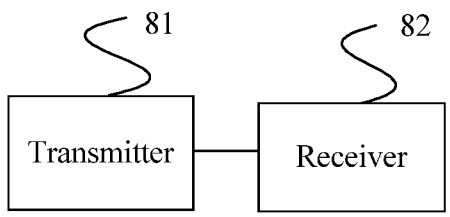
FIG. 15 is a schematic structural diagram of Embodiment 8 of a network device according to the present invention.

FIG. 15 is a schematic structural diagram of Embodiment 8 of a network device according to the present invention. As shown in FIG. 15, the network device in this embodiment may include a transmitter 81 and a receiver 82. The transmitter 81 is configured to send downlink data to a terminal device UE in each subframe in a first subframe set. The first subframe set includes N subframes, and each of the N subframes is a downlink full subframe, or M of the N subframes are downlink partial subframes, and N-M of the N subframes are downlink full subframes, where M is less than or equal to N, and both M and N are integers. The transmitter 81 is further configured to send first downlink control information to the UE. The receiver 82 is configured to: receive, on a target physical uplink control channel resource in a first uplink subframe, first uplink control information sent by the UE, or skip receiving the first uplink control information on the target physical uplink control channel resource in the first uplink subframe.

The resource allocation index value is indication information in downlink control information corresponding to downlink data in some or all subframes in the first subframe set.

Optionally, the resource allocation index value is a first-type index value or a second-type index value, the first-type index value is corresponding to an index value of the target physical uplink control channel resource in a reference physical uplink control channel resource set, the second-type index value indicates that there is no target physical uplink control channel resource, and the reference physical uplink control channel resource set is a set of physical uplink control channel resources configured by the network device for the UE.

The network device in this embodiment may be configured to execute the technical solution in the method embodiment shown in FIG. 11. An implementation principle and a technical effect of the network device are similar to those in the method embodiment and are not described herein again.

The embodiments in this specification are all described in a progressive manner, for same or similar parts in the embodiments, reference may be made to these embodiments, and each embodiment focuses on a difference from other embodiments. Especially, a system embodiment is basically similar to a method embodiment, and therefore is described briefly; for related parts, reference may be made to partial descriptions in the method embodiment.

A person of ordinary skill in the art may understand that, each aspect of this application or a possible implementation of each aspect may be specifically implemented as a system, a method, or a computer program product. Therefore, aspects of this application or possible implementations of the aspects may use forms of hardware only embodiments, software only embodiments (including firmware, resident software, and the like), or embodiments with a combination of software and hardware, which are uniformly referred to as "circuit", "module", or "system" herein. In addition, the aspects of this application or the possible implementations of the aspects may take a form of a computer program product, and the computer program product is computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be locally executed on a user computer, or some may be locally executed on a user computer as a standalone software package, or some may be executed on a local computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

Obviously, a person skilled in the art can make various modifications and variations to this application without departing from the spirit and scope of this application. This application is intended to cover these modifications and variations of this application provided that they fall within the scope of protection defined by the following claims and their equivalent technologies

What is claimed is:

1. A method, implemented by a terminal device, comprising:
receiving downlink data from a network device in each subframe in a first subframe set, wherein the first subframe set comprises N subframes, and N is an integer; and
obtaining first downlink control information from the network device, the first downlink control information comprises first indication information, in response to the first indication information being a first information:
sending a physical uplink control channel in an uplink subframe, wherein the physical uplink control channel comprises hybrid automatic repeat request acknowledgement information corresponding to the downlink data received from the network device in each subframe in the first subframe set, and
adjusting transmit power of the physical uplink control channel based on a first power adjustment value and a second power adjustment value, wherein the first downlink control information further comprises second indication information, the second indication information indicates the first power adjustment value, and wherein the second power adjustment value is indicated by an indication value of a power adjustment field in downlink control information comprised in a first control information group, wherein the first control information group consists of downlink control information corresponding to downlink data in each subframe in a second subframe set, the second subframe set is a set of subframes in the first subframe set that are located on a first carrier, and the first carrier is a carrier on which the physical uplink control channel is located.

2. The method according to claim 1, wherein a format of the first downlink control information comprises an indication bit of third indication information, the indication bit of third indication information indicates resource block assignment, demodulation reference signal cyclic shift and demodulation reference signal orthogonal code index of the physical uplink control channel.

3. The method according to claim 1, wherein the first carrier is a carrier in a carrier configuration set, the carrier configuration set is a set of carriers configured for the terminal device to communicate with the network device, the carrier configuration set comprises H carriers, and the first carrier is a $G^{th}$ carrier in the carrier configuration set, wherein both G and H are positive integers, H≥2, 1≤G≤H, and a value of G can vary in all subframes.

4. The method according to claim 1, wherein M is an integer less than or equal to N, wherein each of the N subframes is a downlink full subframe, or wherein M of the N subframes are downlink partial subframes and N-M of the N subframes are downlink full subframes.

5. The method according to claim 1, wherein sending a physical uplink control channel in an uplink subframe is in accordance with an indication of the first downlink control information.

6. The method according to claim 1, wherein the method further comprises sending, in response to the first indication information being second information, a physical uplink shared channel.

7. A method, implemented by a network device, comprising:
sending downlink data to a terminal device in each subframe in a first subframe set, wherein the first subframe set comprises N subframes, and N is an integer;
sending first downlink control information to the terminal device, the first downlink control information includes first indication information; and
receiving, in response to the first indication information being first information, a physical uplink control channel from the terminal device in an uplink subframe, wherein the physical uplink control channel comprises hybrid automatic repeat request acknowledgement information corresponding to the downlink data received from the network device in each subframe in the first subframe set, wherein the first downlink control information further comprises second indication information, the second indication information indicates a first power adjustment value, and transmit power of the physical uplink control channel comprises a power adjustment amount corresponding to the first power adjustment value, wherein the transmit power of the physical uplink control channel further comprises a power adjustment amount corresponding to a second power adjustment value, the second power adjustment value is indicated by an indication value of a power adjustment field in downlink control information comprised in a first control information group, the first control information group consists of downlink control information corresponding to downlink data in each subframe in a second subframe set, and the second subframe set is a set of subframes in the first subframe set that are located on a first carrier, and the first carrier is a carrier on which the physical uplink control channel is located.

8. The method according to claim 7, wherein a format of the first downlink control information comprises an indication bit of third indication information, the indication bit of third indication information indicates resource block assignment, demodulation reference signal cyclic shift and demodulation reference signal orthogonal code index of the physical uplink control channel.

9. The method according to claim 7, wherein the first carrier is a carrier in a carrier configuration set, the carrier configuration set is a set of carriers configured for the terminal device to communicate with the network device, the carrier configuration set comprises H carriers, and the first carrier is a $G^{th}$ carrier in the carrier configuration set, wherein both G and H are positive integers, H≥2, 1≤G≤H, and a value of G can vary in all subframes.

10. The method according to claim 7, wherein M is an integer less than or equal to N, wherein each of the N subframes is a downlink full subframe, or wherein M of the N subframes are downlink partial subframes and N-M of the N subframes are downlink full subframes.

11. A terminal device comprising:
a receiver configured to:
receive downlink data from a network device in each subframe in a first subframe set, wherein the first subframe set comprises N subframes, and N is an integer, and
obtain first downlink control information from the network device, the first downlink control information comprises first indication information; and
a transmitter configured to:
send, in response to the first indication information being first information, a physical uplink control channel in an uplink subframe, wherein the physical uplink control channel comprises hybrid automatic repeat request acknowledgement information corresponding to the downlink data received from the network device in each subframe in the first subframe set, and
adjust transmit power of the physical uplink control channel based on a first power adjustment value and a second power adjustment value, wherein the first downlink control information further comprises second indication information, the second indication information indicates the first power adjustment value, and wherein the second power adjustment value is indicated by an indication value of a power adjustment field in downlink control information comprised in a first control information group, wherein the first control information group consists of downlink control information corresponding to downlink data in each subframe in a second subframe set, the second subframe set is a set of subframes in the first subframe set that are located on a first carrier, and the first carrier is a carrier on which the physical uplink control channel is located.

12. The terminal device according to claim 11, wherein in an instance where the first indication information is the first information, a format of the first downlink control information comprises an indication bit of third indication information, the indication bit of third indication information indicates resource block assignment, demodulation reference signal cyclic shift and demodulation reference signal orthogonal code index of the physical uplink control channel.

13. The terminal device according to claim 11, wherein the first carrier is a carrier in a carrier configuration set, the carrier configuration set is a set of carriers configured for the terminal device to communicate with the network device, the carrier configuration set comprises H carriers, and the first carrier is a $G^{th}$ carrier in the carrier configuration set, wherein both G and H are positive integers, H≥2, 1≤G≤H, and a value of G can vary in all subframes.

14. The terminal device according to claim 11, wherein the transmitter is further configured to send, in response to the first indication information being second information, a physical uplink shared channel.

15. The terminal device according to claim 11, wherein M is an integer less than or equal to N, wherein each of the N subframes is a downlink full subframe, or wherein M of the N subframes are downlink partial subframes and N-M of the N subframes are downlink full subframes.

16. A network device comprising:
a transmitter configured to:
send downlink data to a terminal device in each subframe in a first subframe set, wherein the first subframe set comprises N subframes, and N is an integer, and
send first downlink control information to the terminal device, the first downlink control information includes a first indication information; and
a receiver configured to:
receive, in response the first indication information being first information a physical uplink control channel from the terminal device in an uplink subframe that instructs the terminal device to send the physical uplink control channel, wherein the physical uplink control channel comprises hybrid automatic repeat request acknowledgement information corresponding to the downlink data received from the network device in each subframe in the first subframe set wherein the first downlink control information further comprises second indication information, the second indication information indicates a first power adjustment value, and transmit power of the physical uplink control channel comprises a power adjustment amount corresponding to the first power adjustment value, wherein the transmit power of the physical uplink control channel further comprises a power adjustment amount corresponding to a second power adjustment value, the second power adjustment value is indicated by an indication value of a power adjustment field in downlink control information comprised in a first control information group, the first control information group consists of downlink control information corresponding to downlink data in each subframe in a second subframe set, and the second subframe set is a set of subframes in the first subframe set that are located on a first carrier, and the first carrier is a carrier on which the physical uplink control channel is located.

17. The network device according to claim 16, wherein a format of the first downlink control information comprises an indication bit of third indication information, the indication bit of third indication information indicate resource block assignment, demodulation reference signal cyclic shift and demodulation reference signal orthogonal code index of the physical uplink control channel.

18. The network device according to claim 16, wherein the first carrier is a carrier in a carrier configuration set, the carrier configuration set is a set of carriers configured for the terminal device to communicate with the network device, the carrier configuration set comprises H carriers, and the first carrier is a $G^{th}$ carrier in the carrier configuration set, wherein both G and H are positive integers, $H \geq 2$, $1 \leq G \leq H$, and a value of G can vary in all subframes.

19. The network device according to claim 16, wherein the receiver is further configured to receive, in response to the first indication information being second information, a physical uplink shared channel from the terminal device in an uplink subframe.

20. The network device according to claim 16, wherein M is an integer less than or equal to N, wherein each of the N subframes is a downlink full subframe, or wherein M of the N subframes are downlink partial subframes and N-M of the N subframes are downlink full subframes.

* * * * *